(12) United States Patent
Yasui et al.

(10) Patent No.: US 8,810,946 B2
(45) Date of Patent: Aug. 19, 2014

(54) ENERGY-ASSISTED MAGNETIC RECORDING HEAD AND MAGNETIC RECORDING DEVICE

(75) Inventors: Kan Yasui, Kodaira (JP); Harukazu Miyamoto, Higashimurayama (JP); Masukazu Igarashi, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/641,239

(22) PCT Filed: Mar. 28, 2011

(86) PCT No.: PCT/JP2011/057629
§ 371 (c)(1),
(2), (4) Date: Oct. 15, 2012

(87) PCT Pub. No.: WO2011/132503
PCT Pub. Date: Oct. 27, 2011

(65) Prior Publication Data
US 2013/0028058 A1    Jan. 31, 2013

(30) Foreign Application Priority Data

Apr. 20, 2010  (JP) ................................. 2010-097124

(51) Int. Cl.
*G11B 5/127*  (2006.01)

(52) U.S. Cl.
USPC ........................................ 360/59; 369/13.14

(58) Field of Classification Search
None
See application file for complete search history.

(56) References Cited

U.S. PATENT DOCUMENTS

| | | |
|---|---|---|
| 2009/0080106 A1 | 3/2009 | Shimizu et al. |
| 2009/0080120 A1 | 3/2009 | Funayama et al. |
| 2011/0058277 A1 | 3/2011 | De la Fuente et al. |
| 2011/0128652 A1 | 6/2011 | Taguchi et al. |
| 2011/0273800 A1* | 11/2011 | Takano et al. ............ 360/125.12 |

FOREIGN PATENT DOCUMENTS

| | | |
|---|---|---|
| JP | 2009-80867 | 4/2009 |
| JP | 2009-80875 | 4/2009 |
| JP | 2011-60412 | 3/2011 |
| JP | 2011-118958 | 6/2011 |

OTHER PUBLICATIONS

Xiaochun Zhu et al., Bia-Free Microwave Oscillator Driven by Perpendicularly Polarized Spin Current, IEEE Transaction on Magnetics, Oct. 2006, pp. 2670-2672, vol. 42, No. 10.
International Search Report; International Application No. PCT/JP2011/057629; Date of Mailing: Jul. 5, 2011.

* cited by examiner

*Primary Examiner* — Wayne Young
*Assistant Examiner* — Brian Butcher
(74) *Attorney, Agent, or Firm* — Antonelli, Terry, Stout & Kraus, LLP.

(57) ABSTRACT

A microwave-assisted magnetic recording system configured to perform magnetic recording with high density, including a high-frequency magnetic field generation element whose width is narrower than a track width of a main pole. A magnetic field vector from the main pole is perpendicularly incident on a film surface of the high-frequency magnetic field generating unit, by a shield material arranged to have a high magnetic permeability so that the main pole magnetic field is corrected and induced, and a hard bias layer to which a desired static magnetic field is added. Areas having high magnetic field gradients overlap each other by performing an offset of the high-frequency magnetic field generating unit of the magnetic head from the central line of the main pole.

8 Claims, 31 Drawing Sheets

ENERGY-ASSISTED MAGNETIC RECORDING HEAD AND MAGNETIC RECORDING DEVICE

RELATED APPLICATIONS

This application is a U.S. national phase application under 35 U.S.C. §371 of International Application No. PCT/JP2011/057629 filed Mar. 28, 2011 claiming priority of Japanese Application No. 2010-097124 filed Apr. 20, 2010.

TECHNICAL FIELD

The present invention relates to an energy-assisted magnetic recording head and a magnetic recording device using the energy-assisted magnetic recording head.

BACKGROUND ART

In order to increase recording density of a hard disk drive (HDD), the miniaturization of the dimension of a magnetic head has been progressing year after year. FIG. 2 illustrates an external view of an HDD. An enclosure includes a magnetic disk 3, a head gimbal assembly (HGA) 4, and a voice coil motor 6 that performs positioning drive of the HGA 4, and the magnetic head is included in a head slider 7 installed at the proximal end part of the HGA 4. The magnetic disk 3 is rotationally driven by a motor. The magnetic head is positioned at a desired track of the magnetic disk by driving the HGA 4 by the voice coil motor 6. As a magnetic head, an induced type head that serves as both of a recording head and a read head has been used in the past, however, the current mainstream is a write/read-separated head that separates a recording head and a reproduction head for improving the performance. The recording head is an inductive head to write information using induced magnetic field by a coil, and the read head is a Giant Magneto-Resistance (GMR) head or a Tunnel Magneto-Resistance (TMR) head using a spin valve as a magnetic sensor.

FIG. 3 illustrates a schematic diagram of a write/read-separated type head that includes a recording head unit 1 and a read head unit 2. A surface viewed from "A" in FIG. 3 corresponds to an air bearing surface (ABS), which faces a magnetic disk, of a head slider. FIG. 4 illustrates an enlarged view around a main pole 8 of the recording head unit 1. The recording head is constituted by the main pole 8, a trailing shield 9, and a side shield 10 when viewed from the ABS surface. The integration of the trailing shield 9 and the side shield 10 is also referred to as a wrap around shield (WAS).

In order to continuously improve the recording density, for a magnetic head, various new technologies have been proposed. Here, two types of new technologies related to the present invention are described. First, a shingled write magnetic recording system for narrowing a recording width (track pitch) on a magnetic disk is described. FIG. 5 is a principle illustrative diagram of the shingled write system. In a conventional recording system, a track pitch is matched with a magnetic recording width by main pole magnetic field, and on the other hand, in the shingled write system, a track pitch is set to become narrower than a magnetic recording width, so that the recording is performed so as to be overwritten on some tracks. Therefore, the scanning direction of the track is limited, for example, to one direction indicated by an arrow 12 of FIG. 5. However, the width of a recording mark 13 can be set to become narrower than the width of the main pole 8, thereby performing recording with high density. In a product of an existing perpendicular magnetic recording technology, the recording density has reached the level of 500 Gb/in$^2$, and, from the fact that there is limitation around 1 Tb/in$^2$, a technology for enhancing the recording density to the improved level of 1 to 2 Tb/in$^2$ has been reviewed. A state in which overwriting is performed in sequence is reminiscent of roof tiles, so that the word of "shingled (tiled)" is used.

In the shape of the recording head for the shingled write system, there is no need to narrow the track width, and with the aim of increasing the magnetic field gradient of a direction across the track (cross-track direction) and obtaining sufficient magnetic field strength in order to sharply perform different writing between tracks, as illustrated in FIG. 6, a structure of the recording head has been proposed in which the narrow side shield 10 is provided only on one side, and as the dimension of the main pole 8, for example, the track width is set as 50 to 150 nm so as to be relatively large. The main point of this technology is to increase the magnetic field gradient on the side used for writing and increase the track pitch, and the design is optimized for the main point. The actual width of a recorded track is set to become narrower than the width of the magnetic pole within a range that takes into account an obtained magnetic field gradient.

Next, a microwave-assisted magnetic recording (MAMR) system is described as another new technology. As discussed in Non Patent literature 1, the MAMR system is a system in which precession of magnetization of a medium is caused by using high-frequency magnetic field by a microwave generation layer and the reversal of magnetization is assisted so as to be easily caused by magnetic field from the main pole. When magnetic anisotropy energy of the medium is increased for high density, the reversal of magnetization is difficult to be caused only by the magnetic field from the main pole, so that such an assisted recording system is desired.

FIG. 7 illustrates a schematic diagram of an MAMR head viewed from a surface (slider side surface) that is perpendicular to an ABS surface and parallel to the central line of the main pole. The MAMR head generates a spin-polarized current in a magnetic layer of a spin injection layer 20 that flows a current from the main pole and is arranged adjacent to the main pole 8, injects the spin-polarized current into a microwave generation layer (field generation layer=FGL) 19, causes oscillation by utilizing spin torque, and generates electromagnetic waves (microwaves) having high-frequency. The microwave is irradiated to a medium 3, locally induces precession of the magnetization, and assists the magnetization reversal by recording head magnetic field. An auxiliary layer 18, etc. are provided adjacently to the FGL layer depending on a configuration. A microwave generation current 21 from the main pole is flowed toward the trailing shield 9.

CITATION LIST

Non Patent Literature

Non Patent literature 1: Xiaochun Zhu and Jian-Gang Zhu, Bias Field Free Microwave Oscillator Driven by Perpendicularly Polarized Spin Current, IEEE trans. Magn., 42, No. 10 (2006)

SUMMARY OF INVENTION

Technical Problem

It has been seen that the MAMR system has high potential for an increase in recording density, however the MAMR is in a principle, verification stage under present circumstance, and a recording experiment by an MAMR head is not performed yet. Therefore, as a technology to break through the wall of the imminent recording density of 1 Tb/in², the introduction of the shingled write system is prioritized. The shingled write system has advantage that there is less development risk because the shingled write system does not need a new principle as compared with the MAMR system, however the shingled write system has disadvantage that writing cannot be performed to a given track in random order due to the restriction of overwriting. Therefore, change of architecture such as a file system is desired, and the change affects not only on the inside of the hard disk drive but also on the whole system. Thus, when the shingled write system has been employed once, it is highly probable that the shingled write system will be continuously employed by non-technological reasons over the subsequent generations as a legacy system. On the other hand, at the latest, in subsequent generations of 2 Tb/in² class of recording density, it is has been seen that the adoption of a new high anisotropy energy (Ku) medium is essential in order to obtain resistance to thermal fluctuation of medium magnetic grains. A certain assisted recording system is desired to perform writing on a medium having high Ku, and it is has been seen that, in subsequent generations, an assisted recording system is used by being combined with the shingled write system.

When the MAMR is combined with the shingled write system, the following new problem occurs. In the shingled write system, in order to obtain steep cross-track magnetic field gradient, a distance with a side shield is designed to be reduced, however a moderately large main pole dimension is desired so that magnetic field strength from the main pole is not reduced. As a result, the main pole dimension is larger than the track width. On the other hand, an FGL dimension for generating high-frequency magnetic field is desired to be 50 nm or less for single magnetic domain. Therefore, in the MAMR head for shingled write, as illustrated in FIG. 8, positions of the end surfaces of the main pole and the FGL 23 do not overlap each other, and there is a problem that it is difficult to perform the steep recording of the magnetization transition in the cross-track direction because the positions of the both of the steepest gradients are displaced. In FIG. 8, a curve line 24 is a magnetic field profile of the main pole, and a curve line 25 indicates the profile of the FGL high-frequency magnetic field. To solve the problem, as illustrated in FIG. 9, a method is conceived in which the center of the FGL 19 and the center 22 of the main pole 8 in the cross-track direction are offset each other, and steep parts of the both gradients are matched. However, in this case, a magnetic field vector 11 from the main pole 8 is obliquely incident on the film surface of the FGL 19, and there is a new problem that the oscillation of the FGL is unstable. For the stable oscillation of the FGL, it is desirable that magnetic field from the main pole is substantially perpendicularly incident on the FGL film surface.

In view of the problems, the present invention provides an MAMR head that causes stable oscillation of the FGL and is capable of recording steep magnetization transition in the cross-track direction, in a magnetic recording system obtained by combining the shingled write system and the MAMR system.

Solution to Problem

As means to solve the above problems, when viewed from the ABS surface, the central line of the FGL of the MAMR in the cross-track direction is offset with respect to the central line of the main pole of the magnetic head for shingled write in the cross-track direction. Alternatively, steep parts of magnetic field gradient of the main pole magnetic field in the cross-track direction and magnetic field gradient of the high-frequency magnetic field of the FGL in the cross-track direction overlap each other by providing a structure in with the both end parts on the same sides are arranged adjacently to each other. In addition, as means to make the magnetic field vector from the main pole incident on the FGL film surface substantially perpendicular, the stable oscillation of the FGL can be performed by using means such as a method for arranging a shield material having high magnetic permeability on the trailing side of the main pole so that the direction of the magnetic field vector is corrected by inducing the main pole magnetic field, a method for arranging a hard bias layer so as to correct the direction of the magnetic field vector by adding magnetic field other than the main pole magnetic field, and a method for forming the FGL to be inclined so that the FGL film surface is substantially perpendicular to the direction of the main pole magnetic field.

In addition, there is also provided means to arrange the FGLs on the both sides of the main pole to use any suitable side of the inner diameter or the outer diameter of the magnetic disk so that the steep state is maintained in the magnetic field gradient in the cross-track direction when there is an angle (skew angle) because the central line of the main pole is inclined for a track, in a case in which the head slider performs recording on any side of the inner diameter or outer diameter of the magnetic disk.

Advantageous Effects of Invention

By a magnetic head of the present invention in which the MAMR system is applied to the shingled write system, a cost for changing a system from the previous system is minimized, and a magnetic recording having higher recording density can be realized, for a high anisotropy energy (Ku) medium that is desired in subsequent generations of 2 Tb/in² class of recording density at the latest. In particular, further higher density recording can be realized by taking advantage of a merit that the track pitch can be reduced in the shingled write system and using the MAMR system that can form a fine magnetic mark by local high-frequency magnetic field from the FGL, and reduction of a resultant cost per recording information unit of the hard disk drive, low power consumption, and speeding up of recording and playback can be realized.

DESCRIPTION OF EMBODIMENTS

Embodiments according to the invention are described below.

Figure 1:
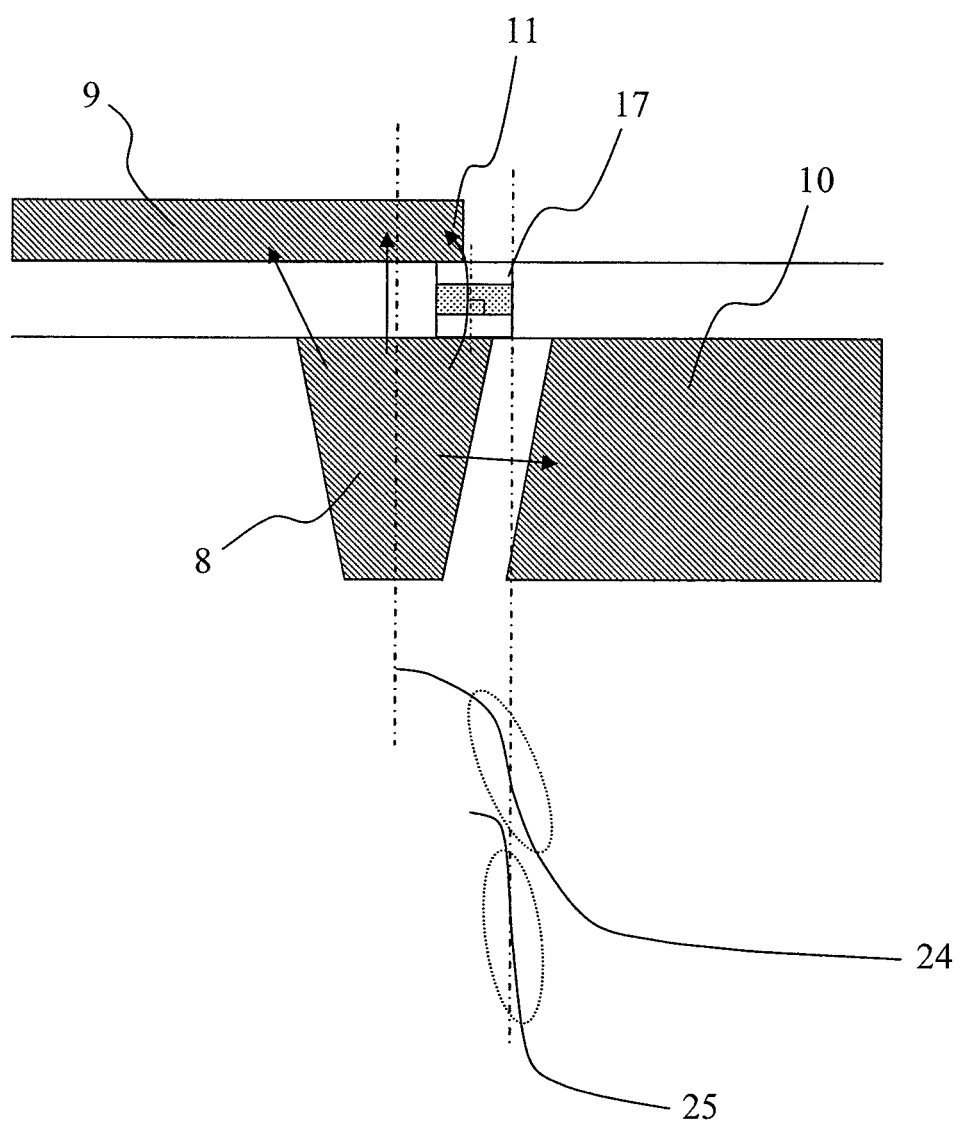
FIG. 1 is a diagram illustrating a solution by the present invention and a first embodiment.
Figure 2:
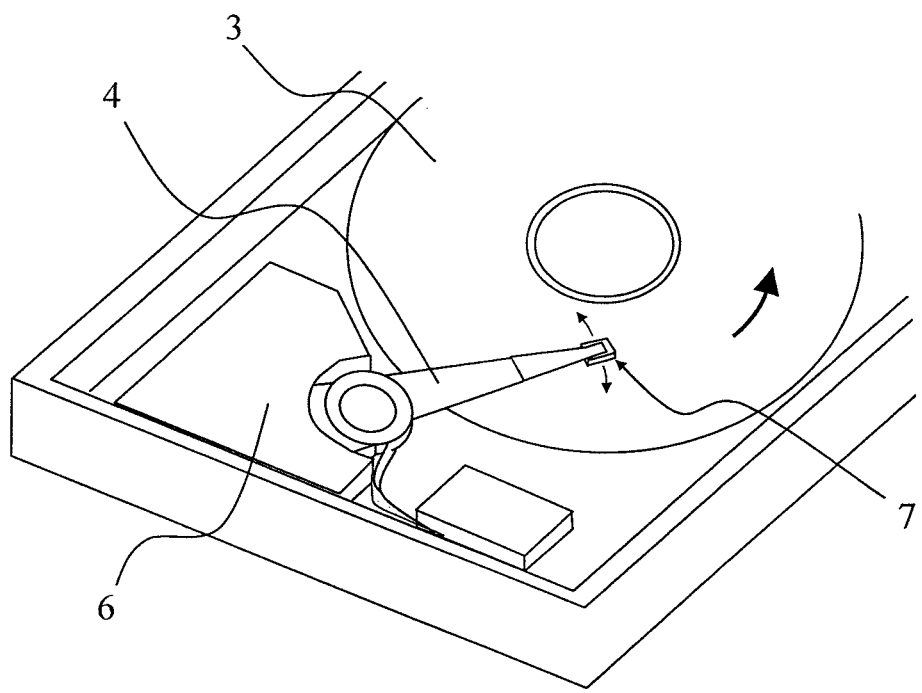
FIG. 2 is an illustrative diagram schematically illustrating a structure of a hard disk drive.
Figure 3:
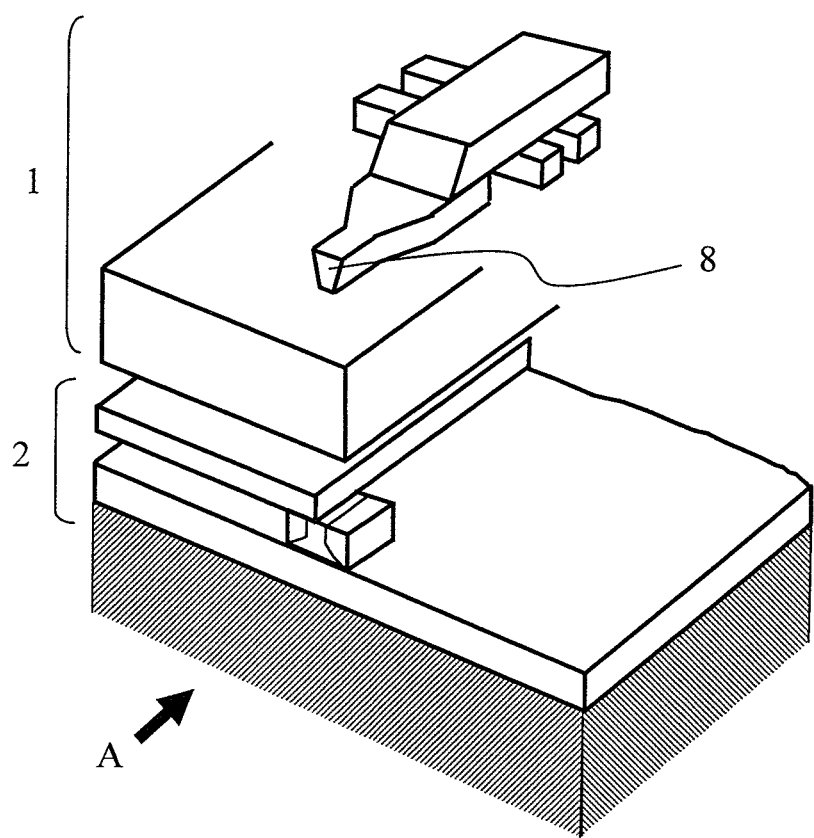
FIG. 3 is an illustrative diagram schematically illustrating a write/read separated type magnetic head.
Figure 4:
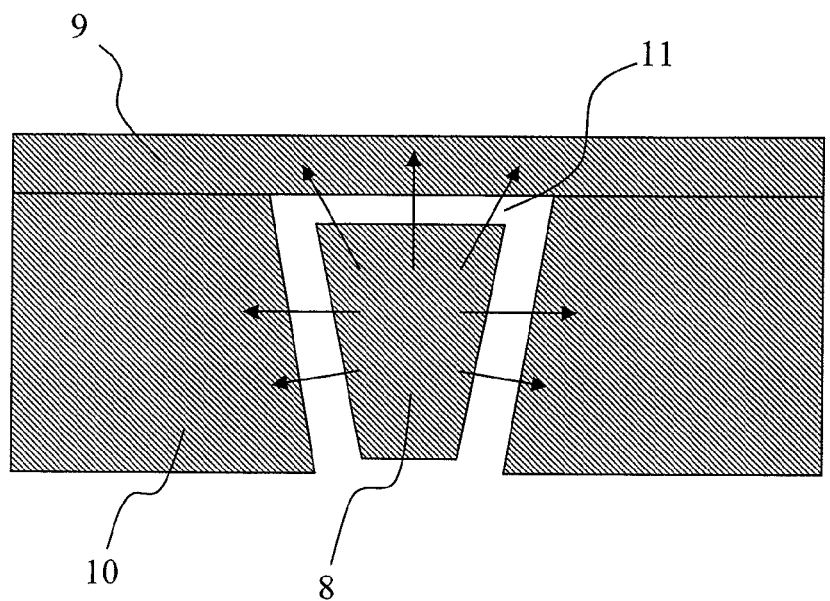
FIG. 4 is an illustrative diagram illustrating the structure around a main pole of the magnetic recording head.
Figure 5:
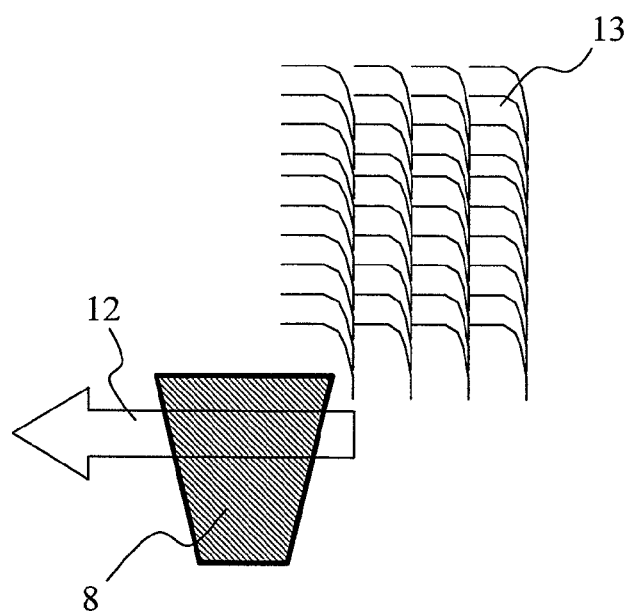
FIG. 5 illustrates a principle illustrative diagram of a shingled write system.
Figure 6:
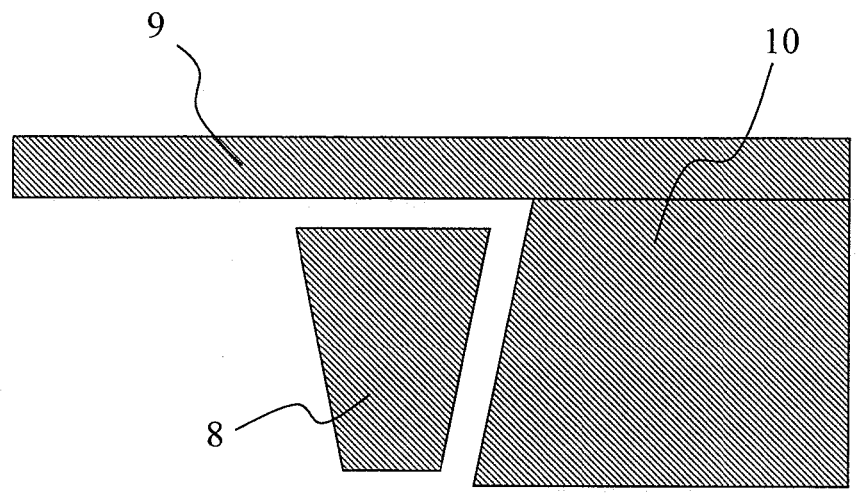
FIG. 6 is an illustrative diagram schematically illustrating the structure of a magnetic recording head for shingled write.
Figure 7:
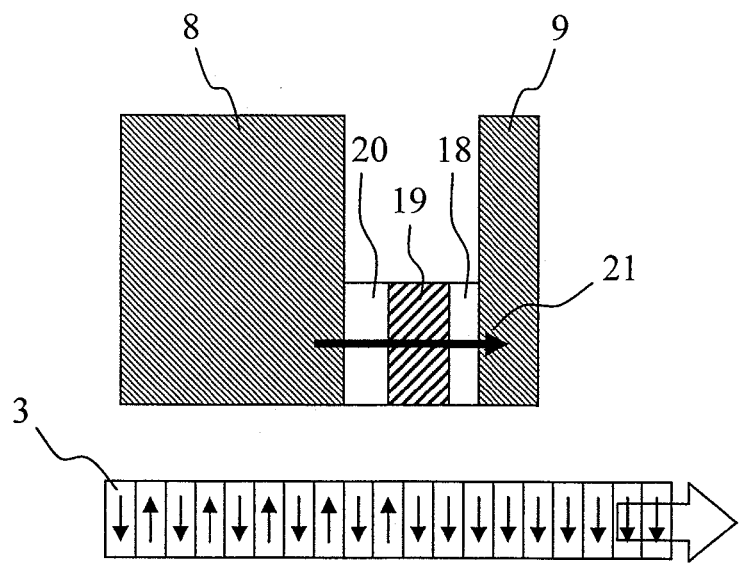
FIG. 7 is a schematic diagram of an MAMR head viewed from a slider side surface.
Figure 8:
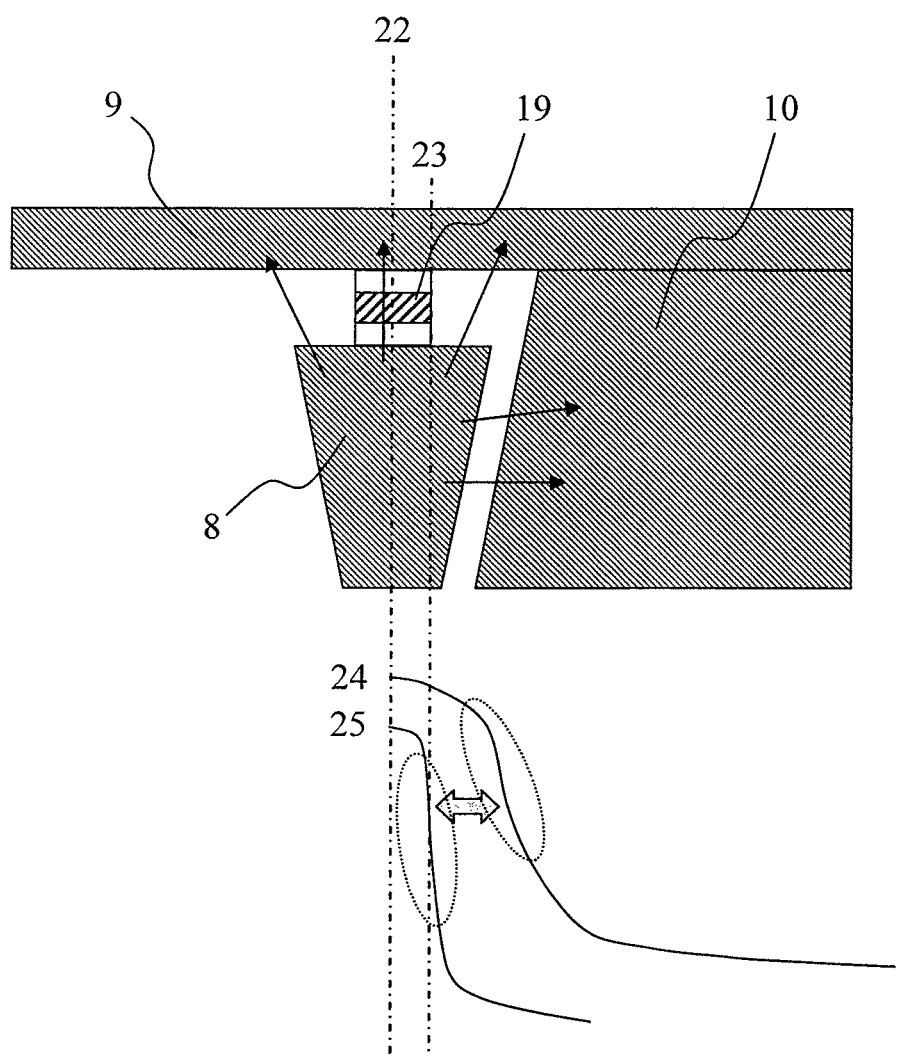
FIG. 8 is an illustrative diagram illustrating the structure of an MAMR head for shingled write and a problem.

First, a first embodiment according to the invention is described. FIG. 1 is an enlarged view when a magnetic recording head of the first embodiment is viewed from an ABS surface. The side shield 10 is arranged so as to be adjacent to the one end side of the main pole 8 in the cross-track direction. A material having high magnetic permeability such as NiFe is used for the side shield 10 and functions to draw magnetic field from the main pole effectively. Basically, in the shingled write system, the side shield 10 only on one side used for recording is desired because only one side of the head is used. The side shield at the unused side is not formed on purpose because magnetic field from the main pole is reduced due to the side shield. In FIG. 1, an MAMR element 17 is arranged above the main pole 8 and adjacent to the trailing end that is the rear side through which the main pole 8 passes for a medium. On the trailing side of the side shield 10, the trailing shield 9 is not arranged.

Figure 10:
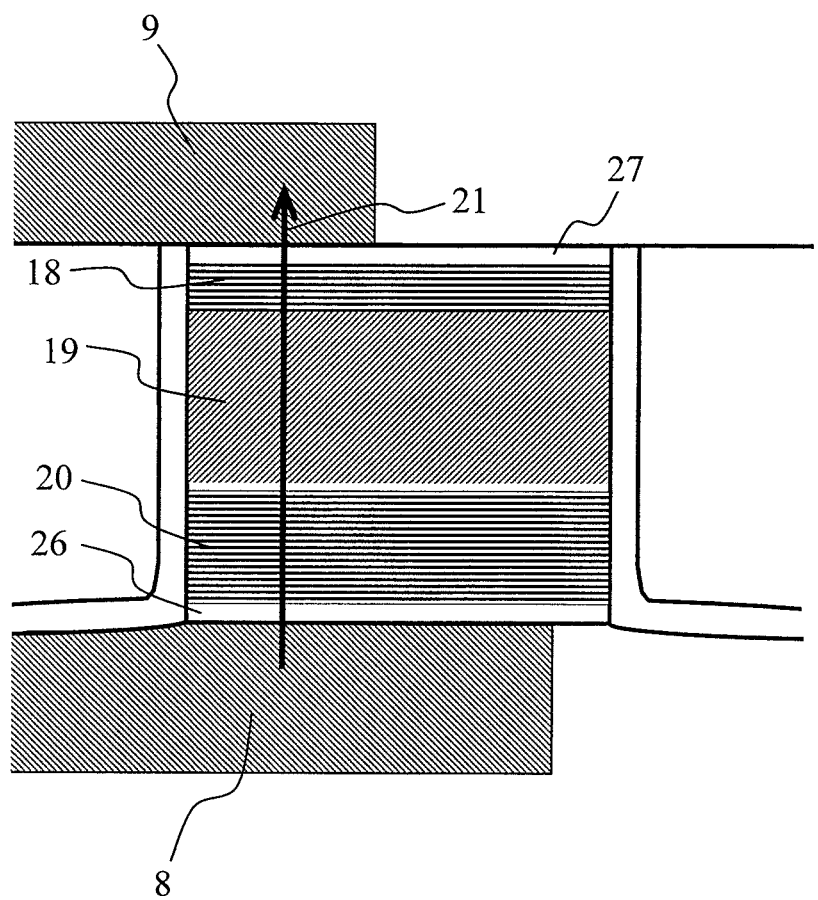
FIG. 10 is an enlarged illustrative diagram of an MAMR element.

FIG. 10 illustrates an enlarged view of the MAMR element 17. The MAMR element is electrically connected to the main pole 8, includes a underlayer 26, the spin injection layer 20, the FGL 19, the auxiliary layer 18, and a cap layer 27 in order from the main pole 8 side, and is electrically connected to the trailing shield 9. For assisting the magnetization of the FGL 19 to stay in the surface, etc., the auxiliary layer 18 is inserted to the MAMR element as appropriate. The microwave generation current 21 for generating high-frequency magnetic field flows from the main pole 8 toward the trailing shield 9. By such a current, a current spin-polarized at the spin injection layer 20 is injected into the FGL 19, and oscillation is caused by spin torque to generate high-frequency magnetic field of GHz to several tens of GHz band. In order to generate the desired high-frequency magnetic field, it is desirable that the FGL 19 has a single magnetic domain in which magnetizations rotate all at once, and it is also desirable that the width of the FGL 19 is about 50 nm or less. This condition is convenient for recording of a narrow track width, and on the other hand, it is desirable that offset of the FGL 19 is performed on a side at which the recording is performed when the main pole 8 of the shingled write system having a large track width of 60 to 120 nm is used under the condition.

Figure 9:
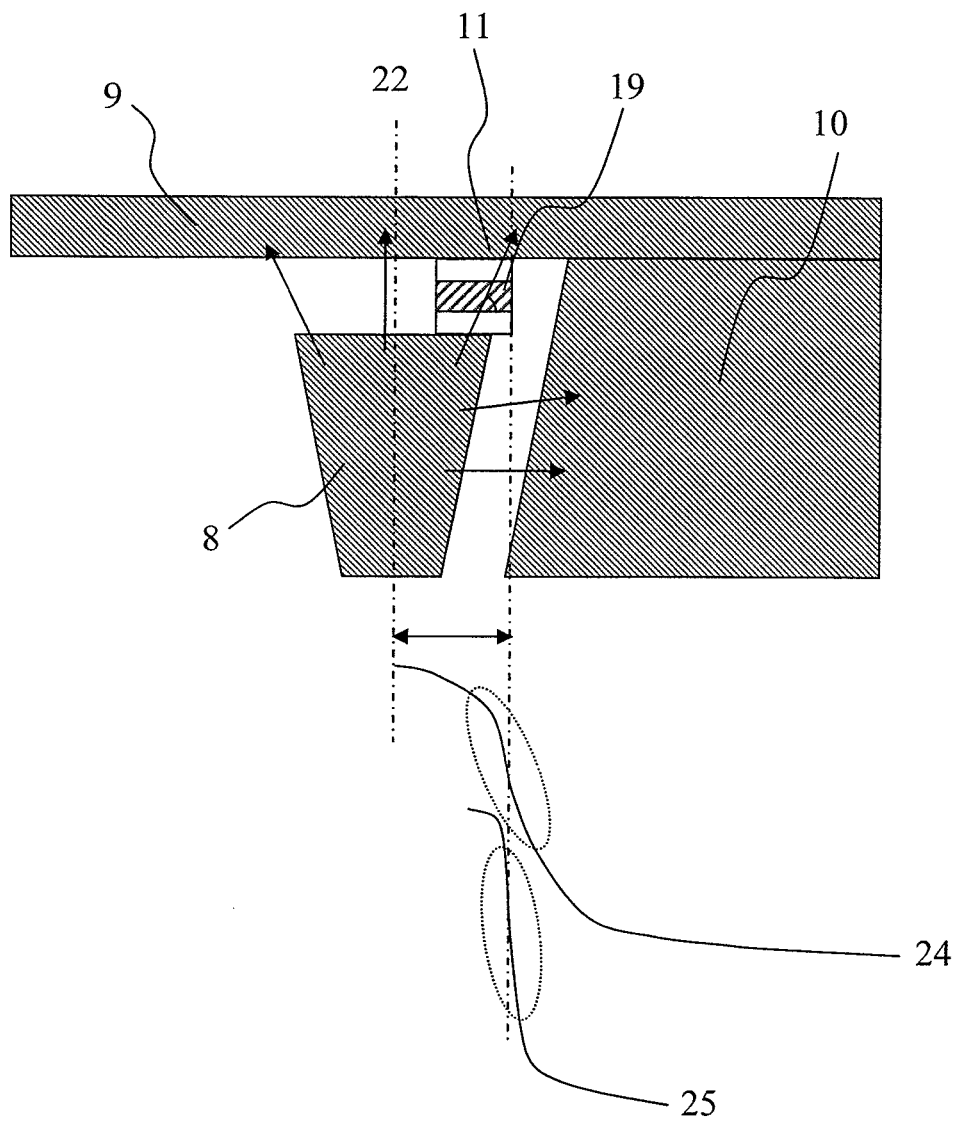
FIG. 9 is an illustrative diagram of an offset type MAMR head for shingled write.

In an existing perpendicular magnetic recording type head, in order to increase magnetic field gradient, a WAS is used in which all around the main pole is covered with a shield, however, as schematically illustrated in FIG. 9, magnetic field from the main pole is obliquely incident on the FGL film surface to become an obstacle for magnetization rotation in the FGL surface because the magnetic field from the main pole tends to move out in a direction expanding from the corner when the offset FGL is arranged for the WAS. Therefore, there is provided a structure in which a part of the WAS in the vicinity of the FGL is removed, and the side shield 10 is separated from the trailing shield 9, as illustrated in FIG. 1. The magnetic field vector tends to be drawn in the directions of the side shield 10 and the trailing shield 9 having high magnetic permeability, so that the magnetic field vector is substantially perpendicular incident on the FGL film surface, thereby achieving the object.

Figure 11:
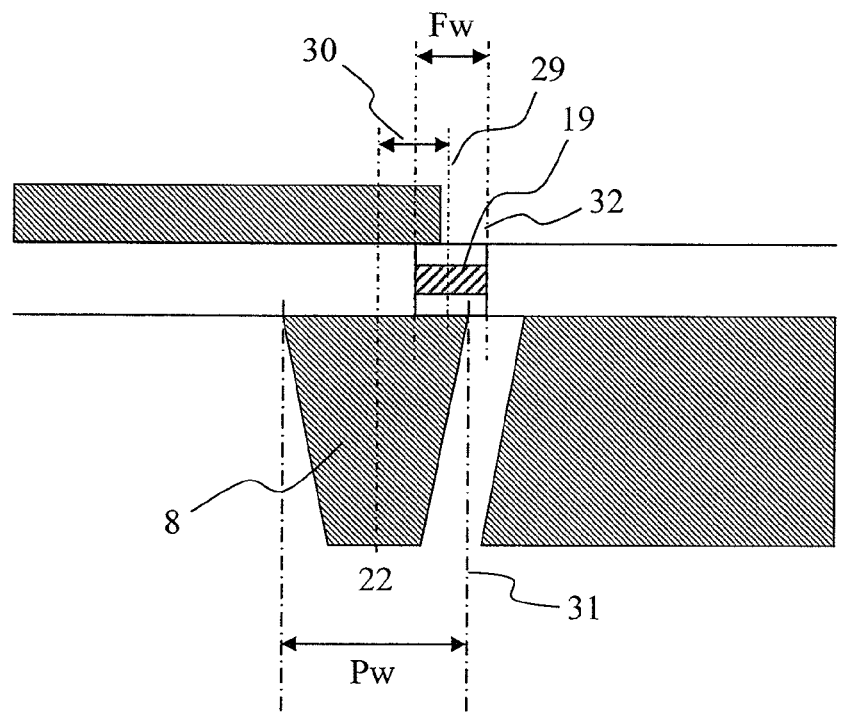
FIG. 11 is a diagram illustrating the first embodiment according to the present invention.

To achieve the object, conceptually the end part of the FGL and the end part of the main pole may be arranged adjacently to each other. For example, the width Fw of the FGL 19 is set to be 50 nm or less and is larger than a design track width Tw with respect to the width Pw (Pw>50 nm) of the main pole 8 illustrated in FIG. 11, and the main pole 8 and the FGL 19 may be arranged so that a distance 30 between the central line 22 of the main pole 8 in the cross-track direction and the central line 29 of the FGL 19 in the cross-track direction is about (Pw−Fw)/2±20 nm. Alternatively, there may be provided a structure in which a position 31 to contribute to the writing in the end part of the main pole 8 is arranged within ±20 nm adjacent to a position 32 to contribute to the writing in the end part of the FGL 19. Steep positions of magnetic field gradient from the main pole and high-frequency magnetic field gradient from the FGL can overlap each other as long as the ±20 nm of distance is secured as design margin for the alignment of end parts because high-frequency magnetic field from the FGL 19 and magnetic field profile from the main pole 8 are sufficiently reduced due to the distance of approximately 40 nm or less.

Figure 12:
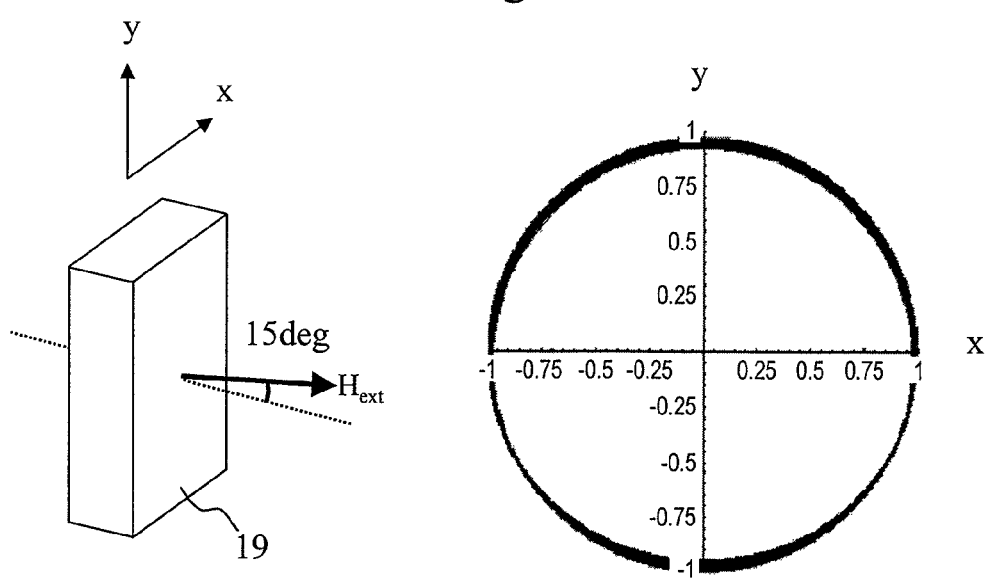
FIG. 12 is a diagram illustrating the simulation result obtained by examining the relationship of a gradient of external magnetic field incident on an FGL film surface (15 degree) and the stability of magnetization rotation.
Figure 13:
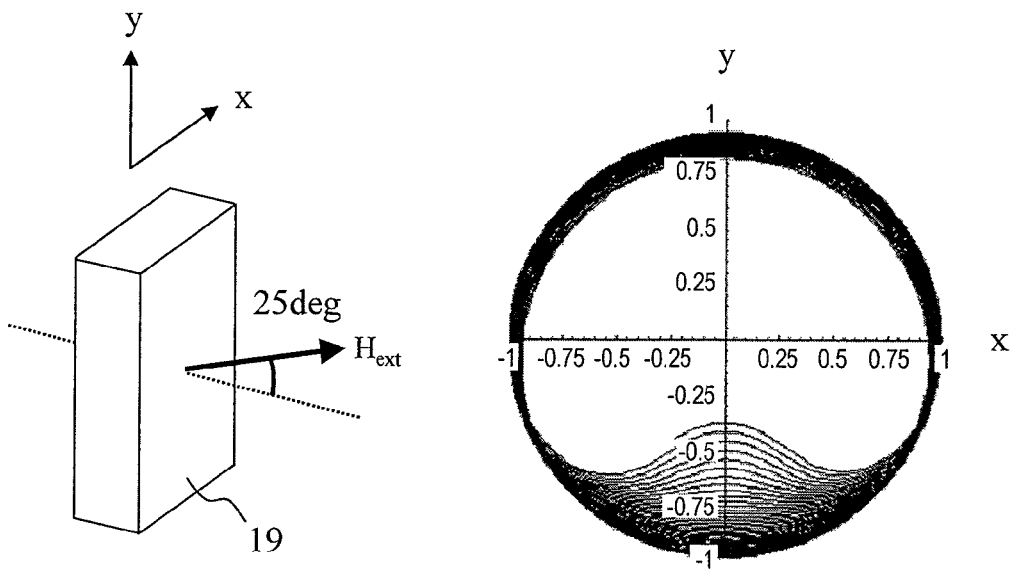
FIG. 13 is a diagram illustrating the relationship of a gradient of external magnetic field incident on the FGL film surface (25 degree) and the stability of magnetization rotation.

In addition, an incident angle that is the above-described "substantially perpendicular" angle and by which the magnetic field vector from the main pole does not interfere with the oscillation of the FGL is, for example, within a range of 90±20 degree according to the computer simulation of the inventors. FIG. 12 illustrates the simulation result of magnetization rotation in a case in which the external magnetic field from the main pole is incident at the angle of 15 degree with respect to the FGL normal direction. The magnetization rotates in the FGL surface (x-y surface) stably. On the other hand, FIG. 13 illustrates the simulation result of magnetization rotation in a case in which the external magnetic field from the main pole is incident at the angle of 25 degree with respect to the FGL normal direction. In this case, it is understood that the rotation of the magnetization is unstable. The stability of the magnetization rotation is determined by a relationship between spin torque by a spin-polarized current injected into the FGL and a component parallel to the FGL film surface among external magnetic field components from the main pole to be precise. Therefore, when the spin-polarized current is large and the spin torque is strong, the stability for strong magnetic field of the FGL film surface component can be obtained, so that, tolerance to deviation from the vertical direction increases. However, in the case of considering the instability caused by the spin-polarized current itself when the spin-polarized current increases and the range of magnetic field strength by the main pole, as an FGL film surface incident angle of the magnetic field vector, the above-described range of 90±20 degree is maximum. In addition, a practically desired robust condition even for various interferences is within a range of 90±10 degree.

Figure 14:
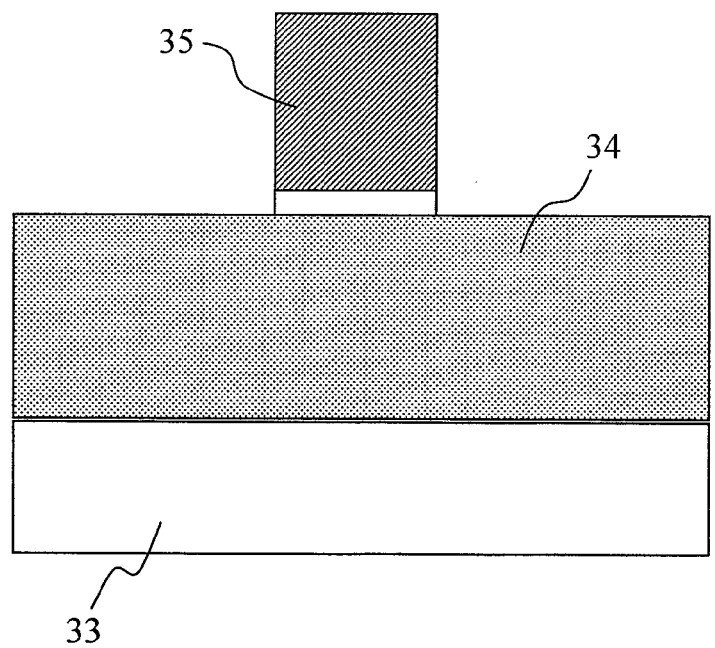
FIG. 14 is a diagram illustrating a process flow of the first embodiment according to the present invention.

Next, a manufacturing process for forming such a head structure is described briefly. The magnetic head is formed on $Al_2O_3$—TiC (alumina titanium carbide) substrate using a microfabrication technology. It is seen that the substrate surface is located in the lower side in FIG. 14, however the illustration of the substrate portion is omitted in the drawings including subsequent figures. First, a read head and a wiring portion of the read head are formed in order from the substrate surface. Here, the description of the process is omitted. FIG. 14 illustrates a stage in which the formation process of the read head is completed, and after a base formation process of a recording head, a main pole material 34 is deposited on an insulation film 33, typically alumina $Al_2O_3$, and a multi-layer mask 35 for forming the main pole is formed. The multi-layer mask 35 is used in which a hard mask such as $SiO_2$ and $Ta_2O_5$ or a photoresist overlaps with on the upper layer of diamond like carbon (DLC). CoFe, NiFe, etc. are used for the main pole material 34.

Figure 15:
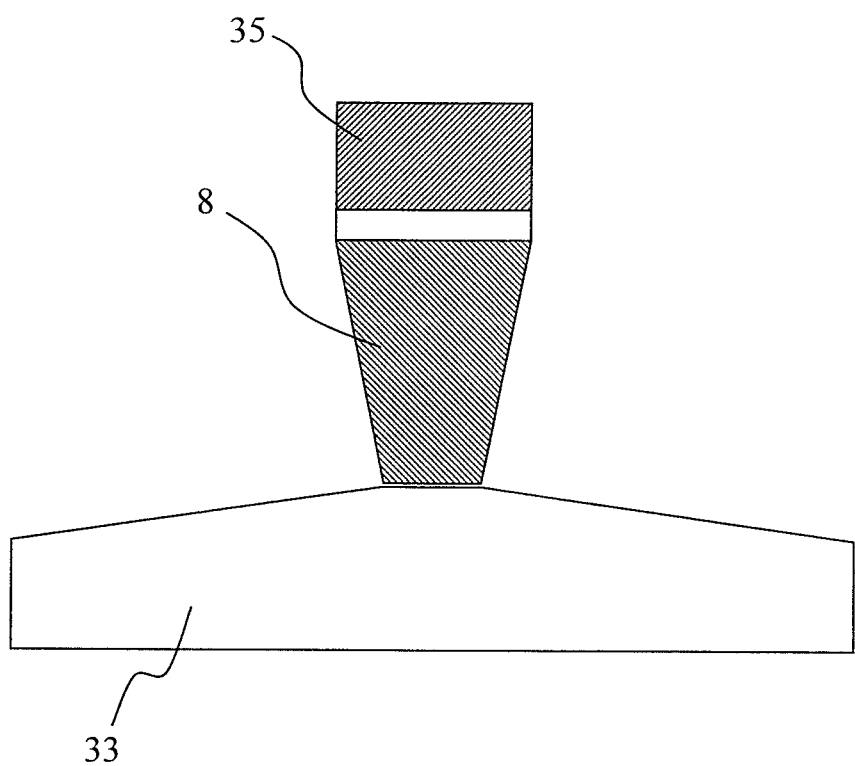
FIG. 15 is a diagram illustrating the process flow of the first embodiment according to the present invention.
Figure 16:
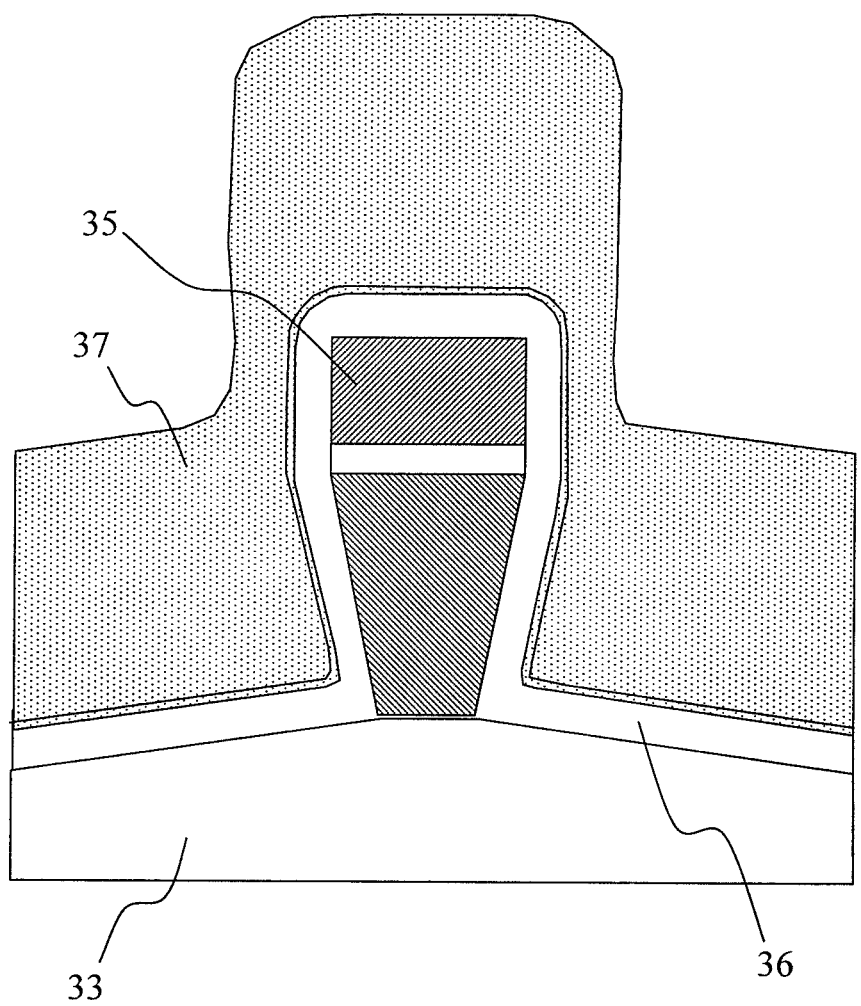
FIG. 16 is a diagram illustrating the process flow of the first embodiment according to the present invention.

FIG. 15 illustrates a stage in which a main pole shape is formed by argon ion milling using the multi-layer mask 35 as a mask. The inverted trapezoid shape of the main pole is formed by adjusting a processing condition of an ion incident angle, etc. of the ion milling. Here, in order to increase a processing rate of an insulation film 33 (alumina), a reactive ion milling, etc. may be used. FIG. 16 illustrates a stage in which, after the stage of FIG. 15, a separation film 36 such as alumina for forming a gap between shields is deposited, and then a side shield material 37 is deposited.

Figure 17:
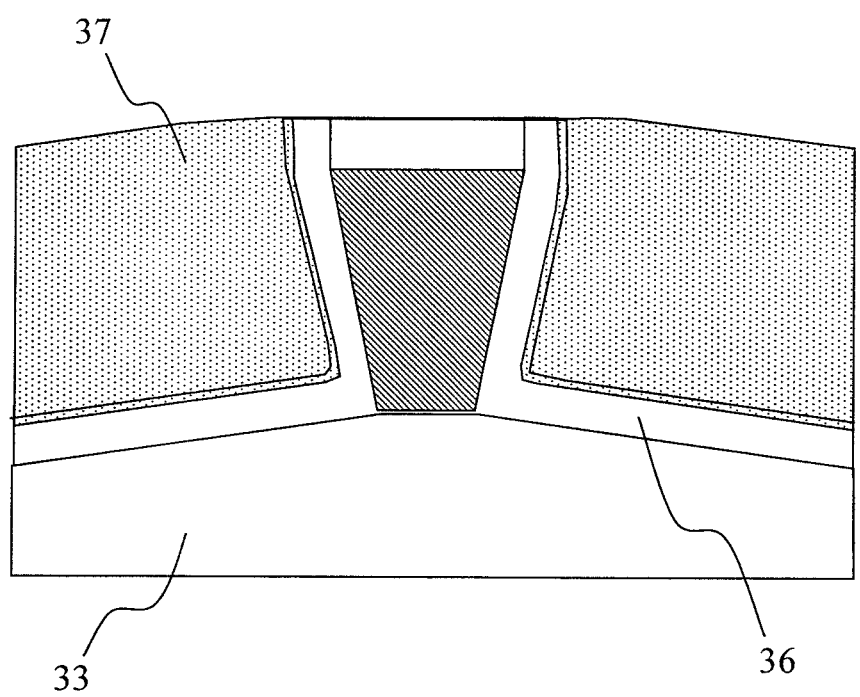
FIG. 17 is a diagram illustrating the process flow of the first embodiment according to the present invention.
Figure 18:
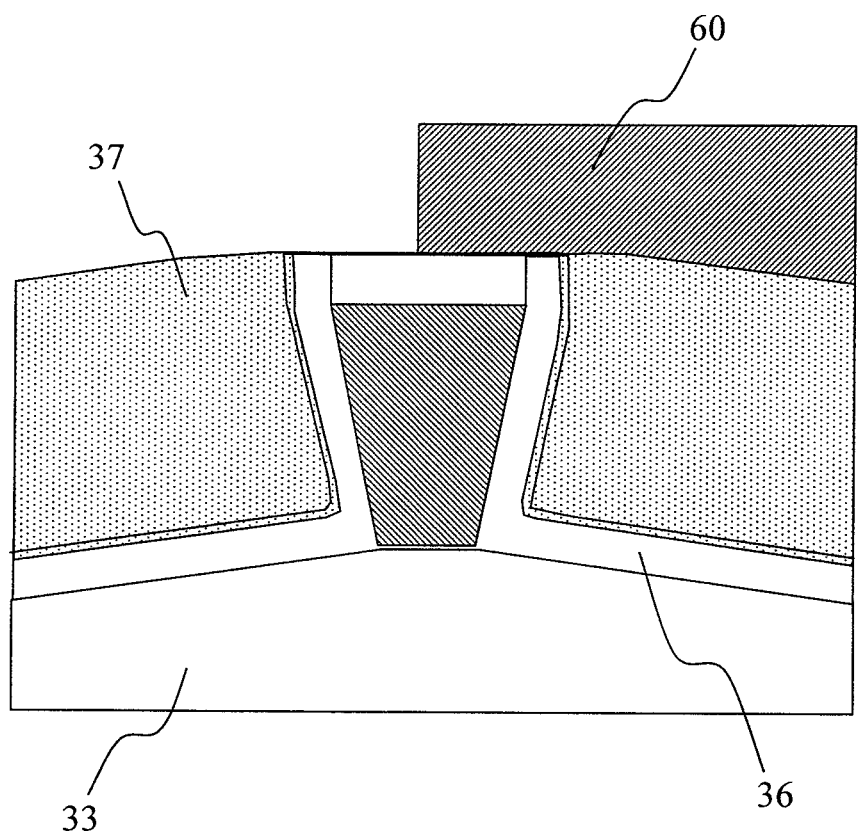
FIG. 18 is a diagram illustrating the process flow of the first embodiment according to the present invention.
Figure 19:
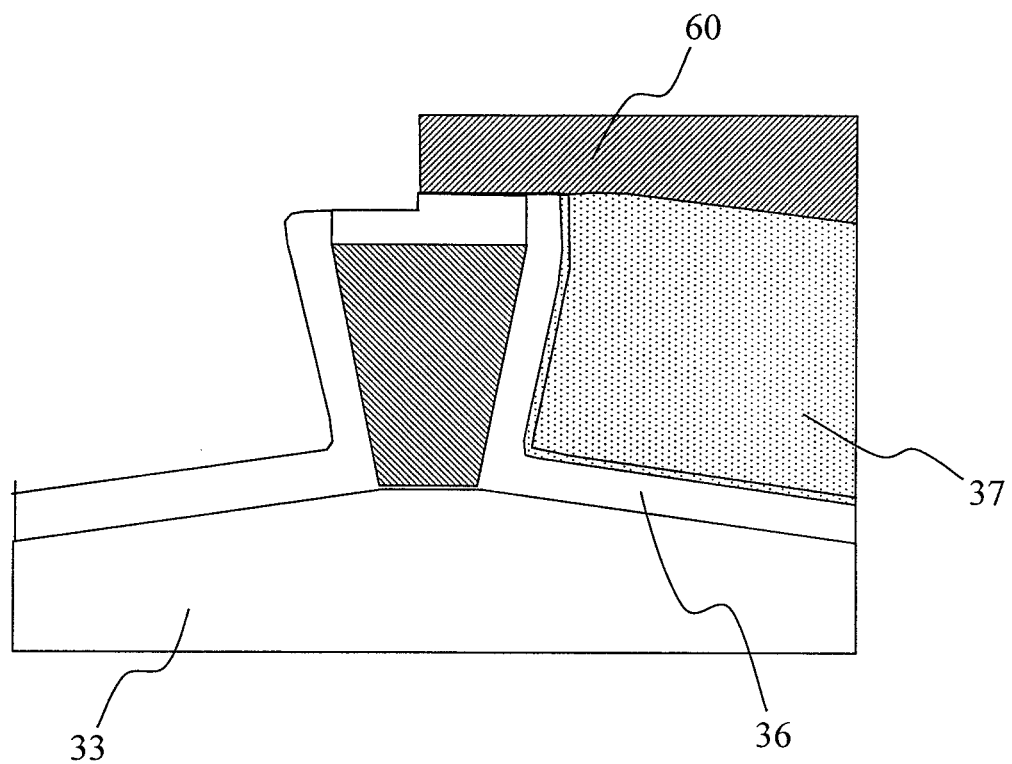
FIG. 19 is a diagram illustrating the process flow of the first embodiment according to the present invention.
Figure 20:
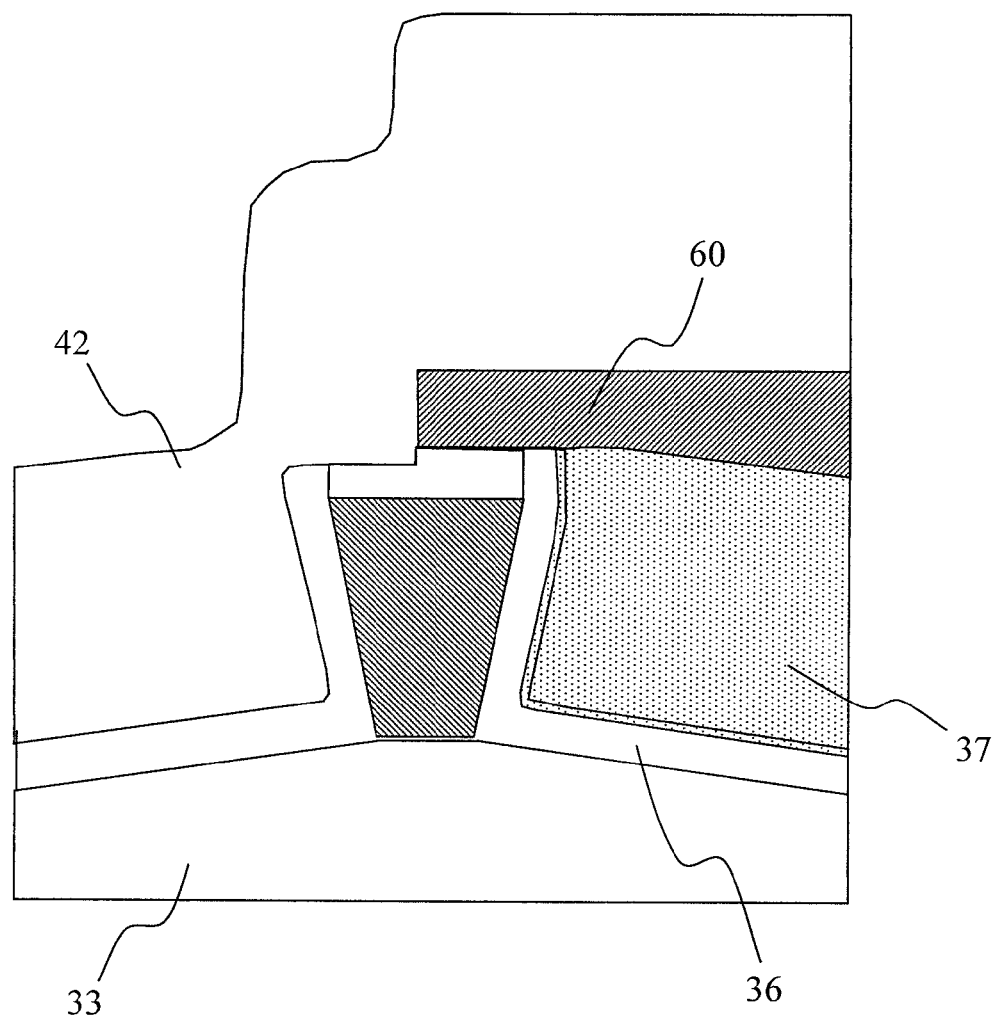
FIG. 20 is a diagram illustrating the process flow of the first embodiment according to the present invention.
Figure 21:
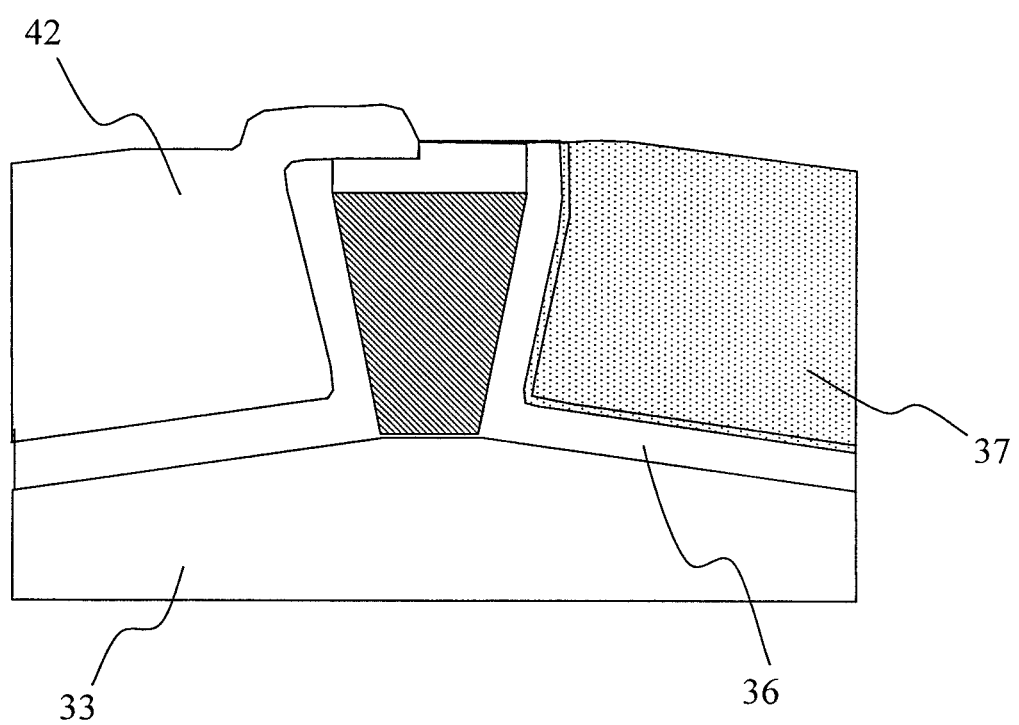
FIG. 21 is a diagram illustrating the process flow of the first embodiment according to the present invention.
Figure 22:
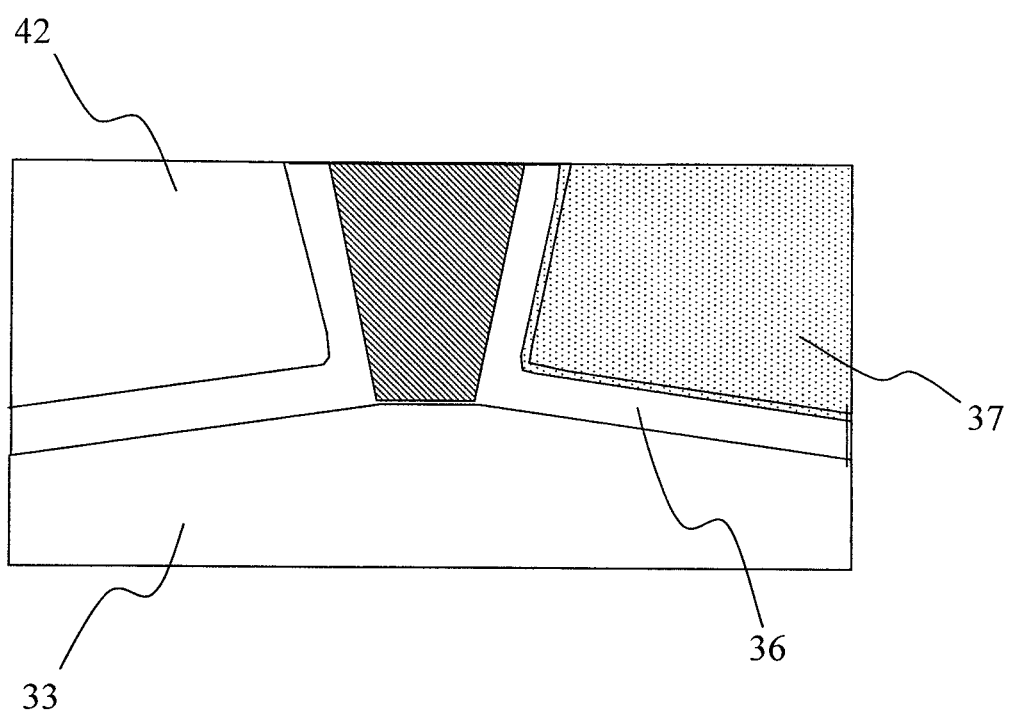
FIG. 22 is a diagram illustrating the process flow of the first embodiment according to the present invention.
Figure 23:
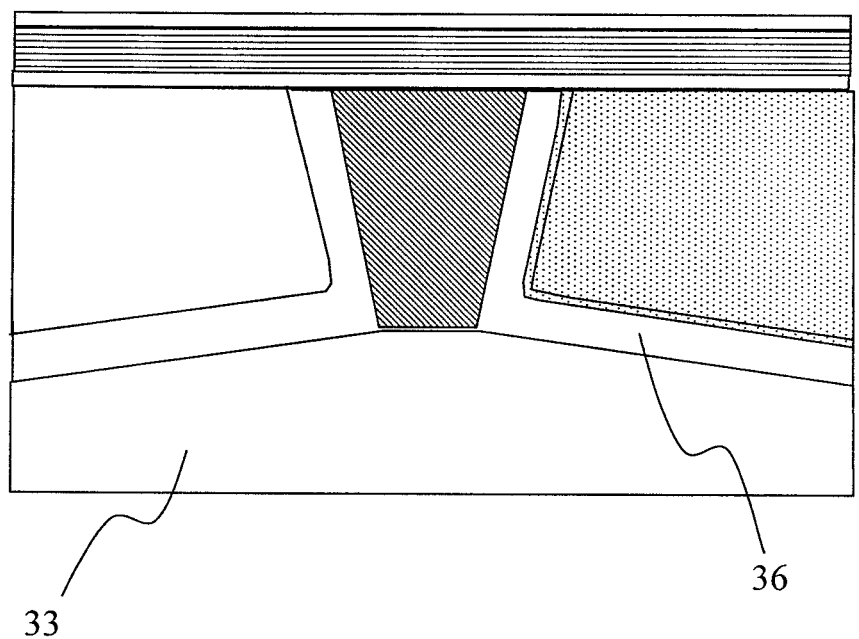
FIG. 23 is a diagram illustrating the process flow of the first embodiment according to the present invention.
Figure 24:
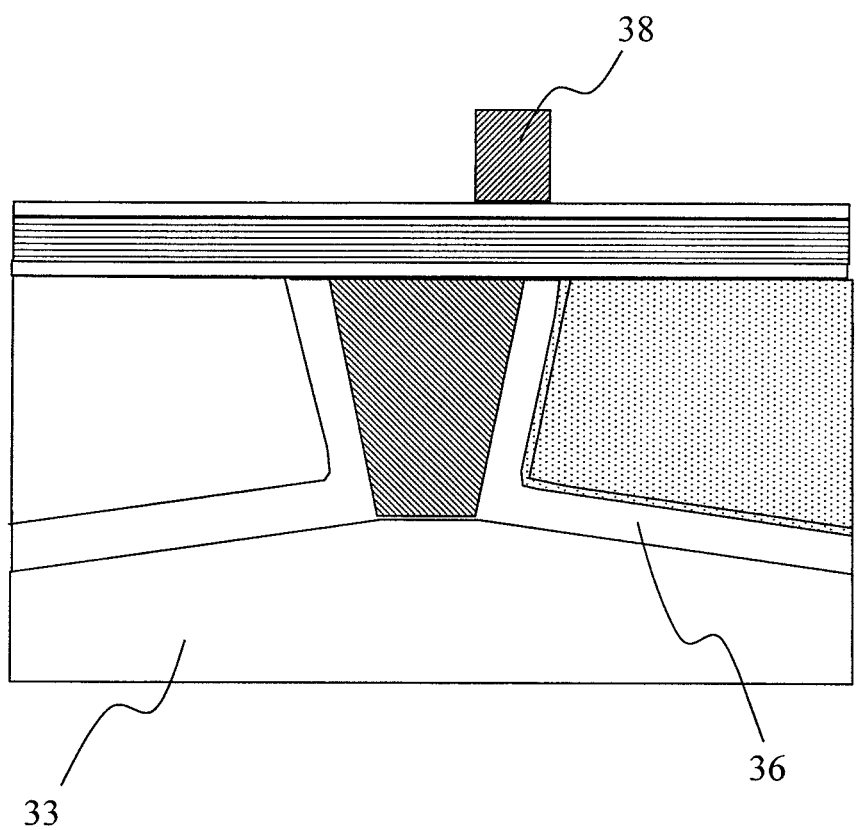
FIG. 24 is a diagram illustrating the process flow of the first embodiment according
Figure 25:
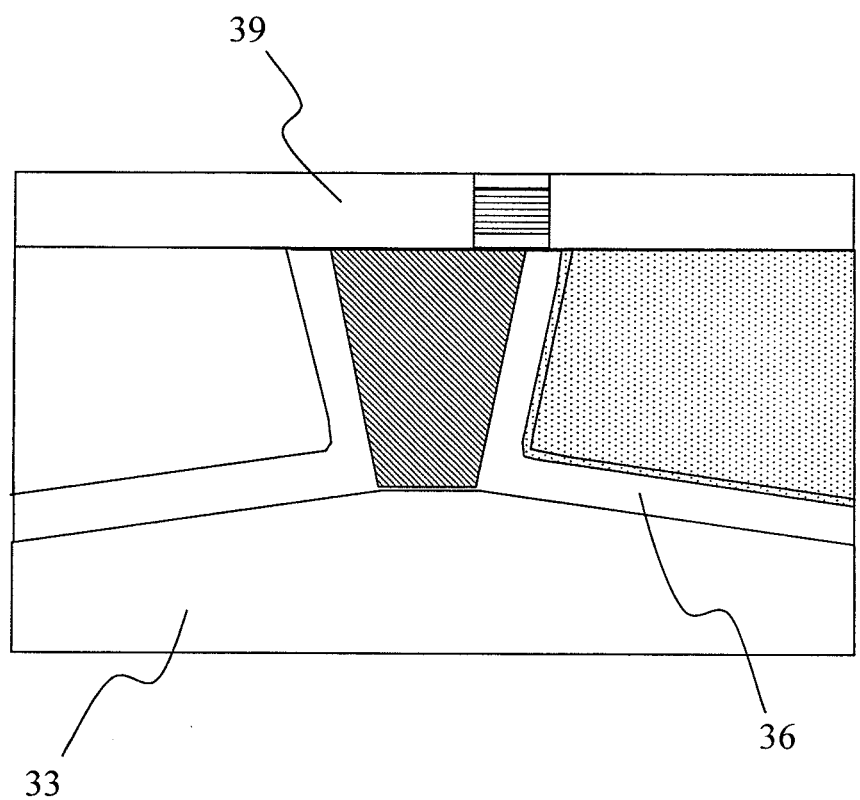
FIG. 25 is a diagram illustrating the process flow of the first embodiment according to the present invention.

Here, FIG. 17 illustrates a stage in which lift-off is performed on the mask 35, etc. using chemical mechanical polishing (CMP), etc. In addition, FIG. 22 illustrates a state in which planarization is performed by the CMP after a photoresist 60 is formed (FIG. 18), the side shield 37 at the unused side is removed (FIG. 19), an insulation film 42 is deposited (FIG. 20), and the insulation film on the photoresist 60 is removed by the lift-off (FIG. 21). FIG. 23 illustrates a state in which magnetic multilayer for forming an MAMR element is deposited after the state of FIG. 22. The MAMR element is constituted by the magnetic multilayer having the structure illustrated in FIG. 10 (the detailed description of the MAMR element is omitted here). FIG. 25 illustrates a state in which, after the state of FIG. 23, as illustrated in FIG. 24, a mask 38 for determining the FGL width is formed, the unnecessary magnetic multilayer is removed by the ion milling, a nonmagnetic separation film 39 is embedded, and the planarization is performed using the CMP lift-off. A single layer insulation film such as alumina, or a lamination film of a nonmagnetic metal film such as ruthenium and an insulation film such as silicon dioxide ($SiO_2$) or alumina ($Al_2O_3$) may be used for the nonmagnetic separation film 39.

Figure 26:
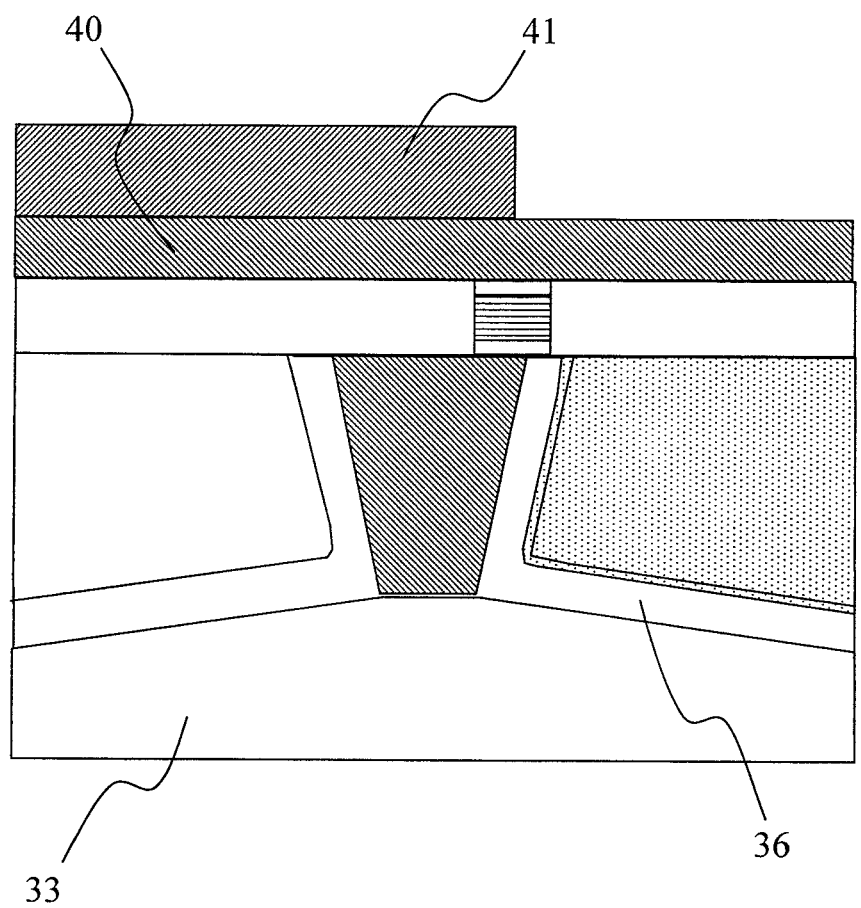
FIG. 26 is a diagram illustrating the process flow of the first embodiment according to the present invention.
Figure 27:
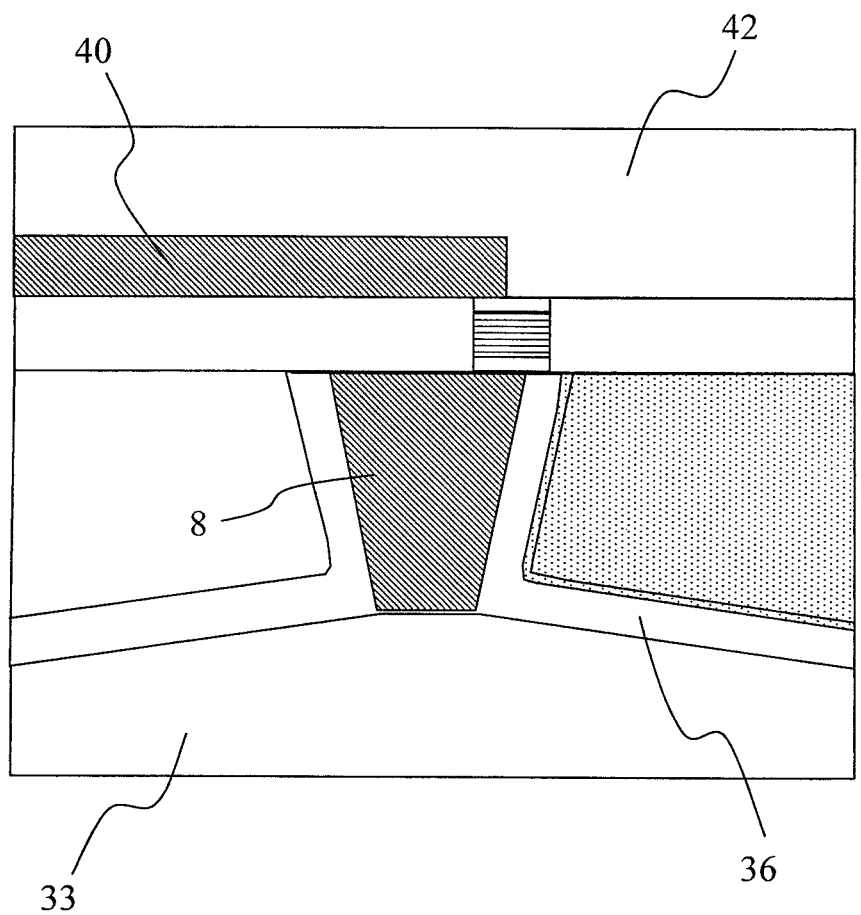
FIG. 27 is a diagram illustrating the process flow of the first embodiment according to the present invention.

FIG. 26 illustrates a stage in which a trailing shield material 40 is deposited and a mask 41 is formed after the stage of FIG. 25, and a desired structure illustrated in FIG. 27 is formed when the unnecessary trailing shield material is removed and the insulation film 42 is embedded. To the MAMR element, a current flows using the main pole 8 and the trailing shield 40. A process called a Damascene method in which the side shield material is formed, then a groove for the main pole is formed, and the main pole material is embedded in the groove to form a main pole (the description is not made here), instead of the process in which the main pole material is formed first, and then the side shield material is deposited as described above.

Figure 28:
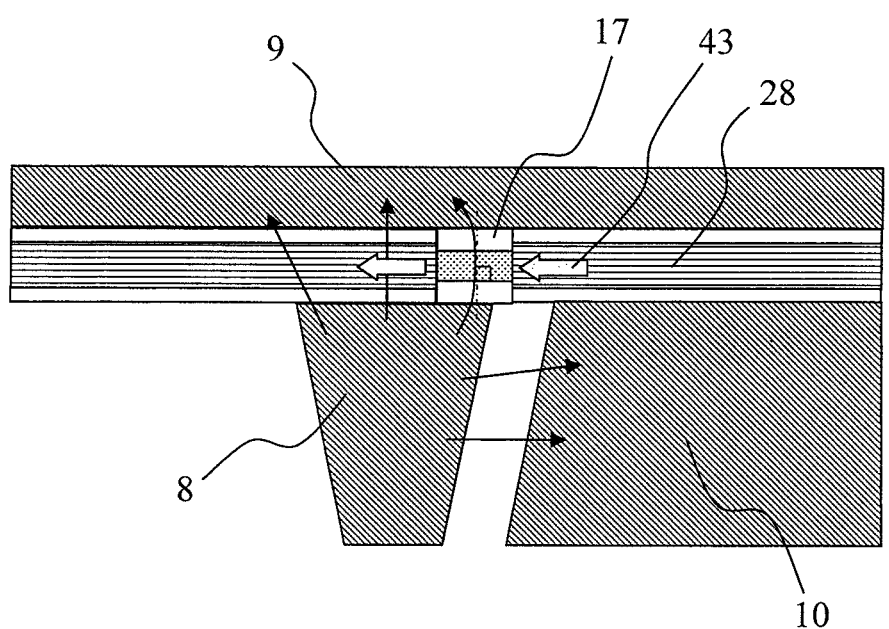
FIG. 28 is a diagram illustrating a second embodiment according to the present invention.

Next, a second embodiment according to the present invention is described. In the second embodiment, a method for providing a hard bias layer for applying static magnetic field on both sides of an FGL is described. FIG. 28 illustrates the structure of the second embodiment. A relationship between the main pole 8 and the side shield 10 is similar to the case of the first embodiment, and a hard bias layer 28 constituted by a permanent magnet is arranged on both sides of the MAMR element 17 formed on the upper part (trailing side). Such a structure in which the hard bias layer is arranged on both sides of the magnetic multilayer is similar to the structure of a read head, and the technology of the manufacturing process of the read head as-is can be utilized for recording head. As illustrated in FIG. 28, the stabilization of the oscillation of the FGL can be realized by correcting the direction of a static magnetic field vector 43 from the hard bias layer 28 that is incident on the FGL surface from the main pole 8 and designing the recording head so that synthetic magnetic field is substantially perpendicular incident on the FGL surface. A current flows through the MAMR element using the main pole 8 and the trailing shield 9.

Figure 29:
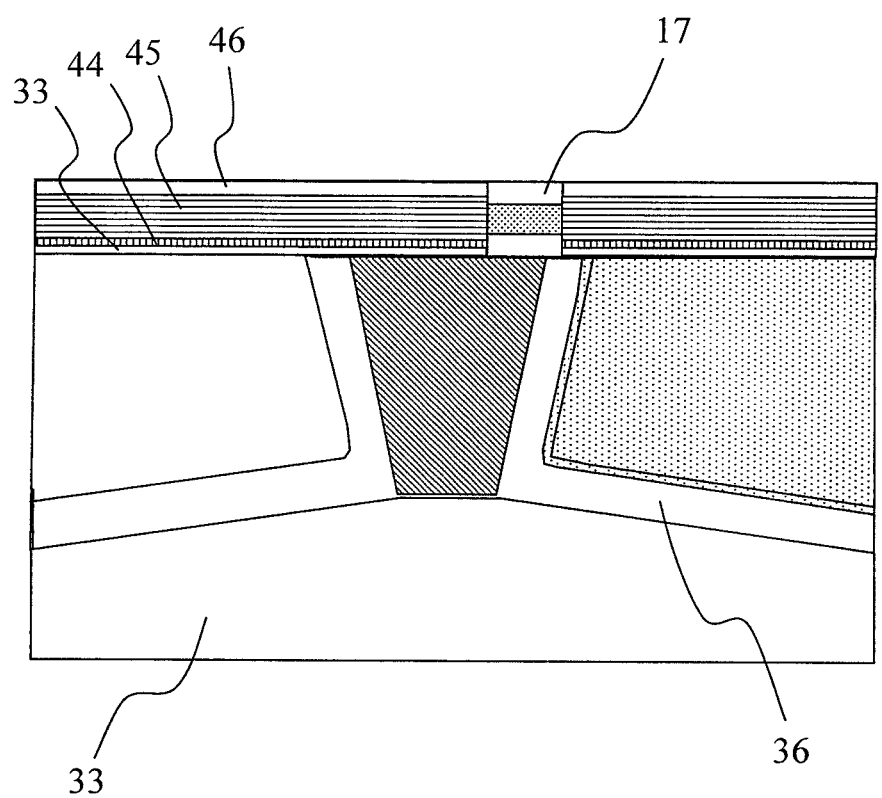
FIG. 29 is a diagram illustrating a process flow of the second embodiment according to the present invention.

A manufacturing process of the recording head of the second embodiment is also described briefly. A stage in which a side shield is formed and a magnetic multilayer for an MAMR element is deposited and the previous stages are similar to the stages of FIG. 23 and previous stages of the first embodiment. After the stage, a mask for determining the FGL width is formed, and unnecessary magnetic multilayer is removed by the ion milling. FIG. 29 illustrates a stage in which, after the stage, the thin insulation film 33 for insulation, a hard bias underlayer 44 for forming a hard bias layer, a hard bias material 45, and a cap material 46 are deposited, and planarization is performed by the removal of the mask, etc. by the CMP lift-off. Typically, a hard magnetic material such as CoCrPt that has large coercivity and magnetization is used for the hard magnetic bias material. In order to improve the characteristics of the hard bias layer, an orientation control underlayer such as Ta or CrMo is provided as appropriate. Nonmagnetic metal such as chromium (Cr), tantalum (Ta), and rhodium (Rh) is used for the cap material 46 to protect the hard bias material 45. The desired structure illustrated in FIG. 28 is formed when a trailing shield material 9 is deposited on the cap material 46.

Figure 30:
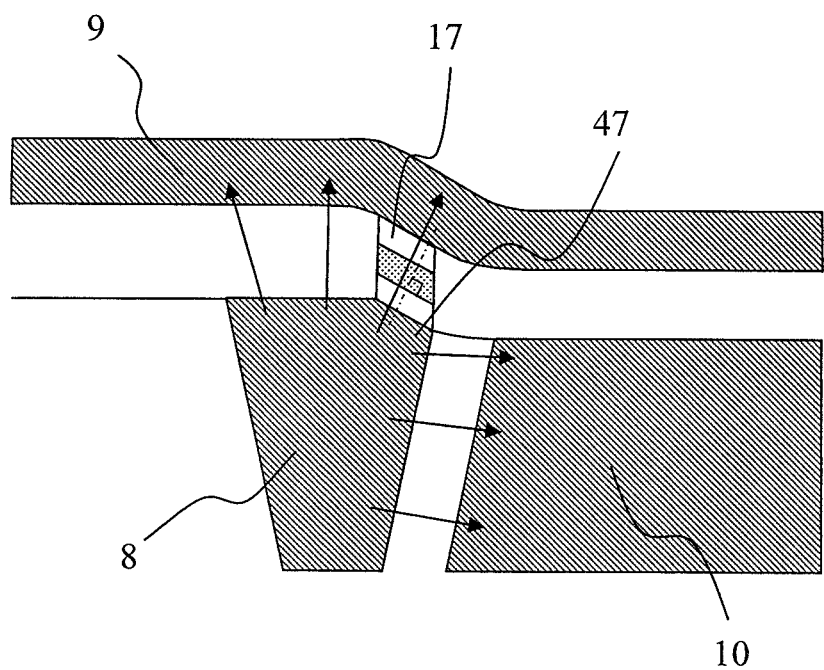
FIG. 30 is a diagram illustrating a third embodiment according to the present invention.

Next, a third embodiment of the present invention is described. In the third embodiment, a method is described in which an FGL is formed obliquely to be substantially perpendicular to magnetic field from the main pole beforehand. FIG. 30 illustrates the structure of the third embodiment. The gradient is formed so that the normal direction in which the magnetic field vector goes out is matched to a corner part 47 of the main pole 8 beforehand. In the MAMR element 17 formed on the gradient, the oscillation becomes stable because the magnetic field is substantially perpendicular incident on the FGL surface. The angle can be stably controlled by the processing condition of the ion milling because a parameter for matching the direction of the magnetic field vector is desired only for the gradient of the corner portion 47 of the main pole, thereby taking advantage of a merit suitable for mass production.

Figure 31:
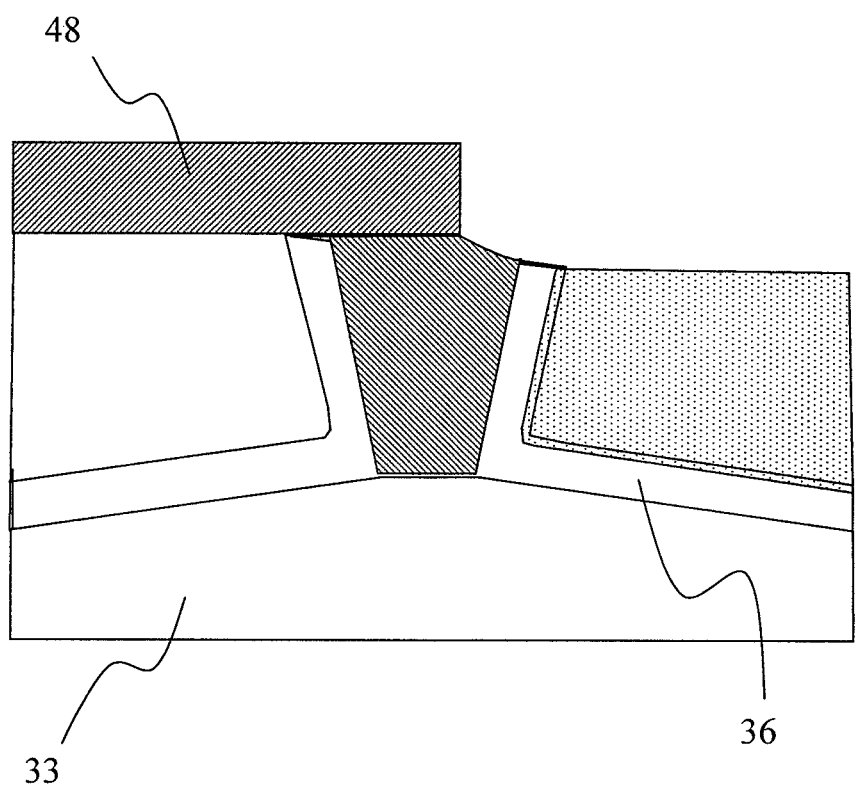
FIG. 31 is a diagram illustrating a process flow of the third embodiment according to the present invention.
Figure 32:
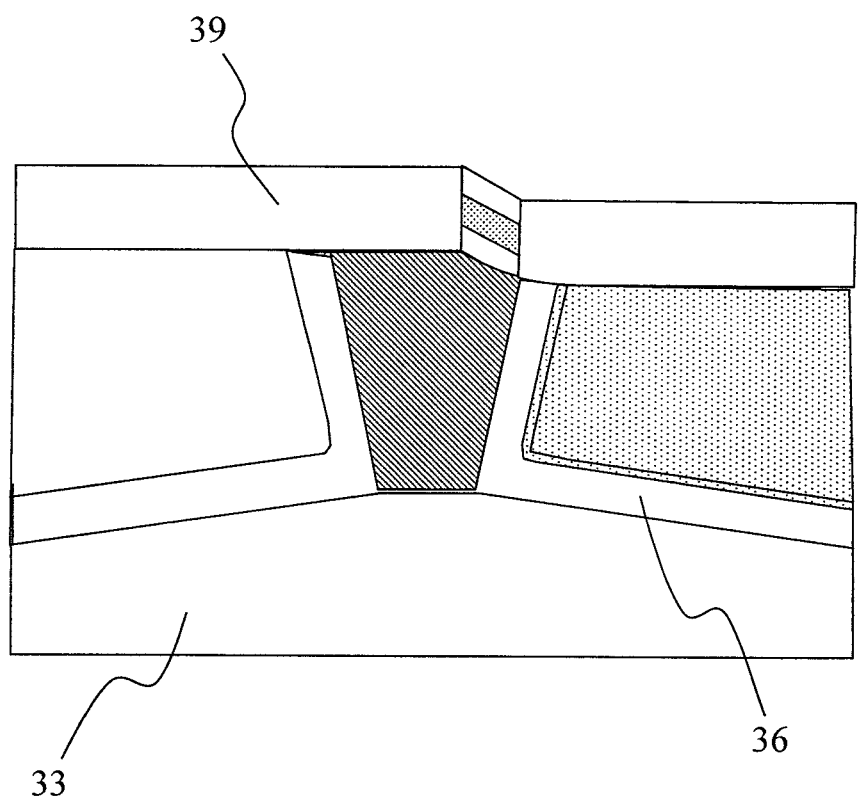
FIG. 32 is a diagram illustrating the process flow of the third embodiment according to the present invention.

A manufacturing process unique to the third embodiment is also described briefly below. A stage in which the main pole and the side shield are formed and the previous stages are similar to the stages of FIG. 22 and the previous stages of the first embodiment. After the stage, a mask 48 for forming a gradient is arranged, and the gradient is formed on the corner part of the main pole by the ion milling as illustrated in FIG. 31. By the ion milling, for example, a milling rate at a portion that is a shadow against the mask 48 is reduced by making ion incident on the substrate from the normal direction at an angle ranging from 30 degree to 60 degree, thereby forming the desired gradient. After removing the mask 48, magnetic multilayer for forming an MAMR element is deposited, a mask for determining the width of the FGL is formed, and unnecessary magnetic multilayer is removed by the ion milling. FIG. 32 illustrate a state in which, after the removal, an insulation film 39 is deposited, and lift-off of the mask, etc. for forming an FGL is performed. After that, the desired structure illustrated in FIG. 30 is formed when the trailing shield 9 is deposited similarly to the first and second embodiments.

Figure 33:
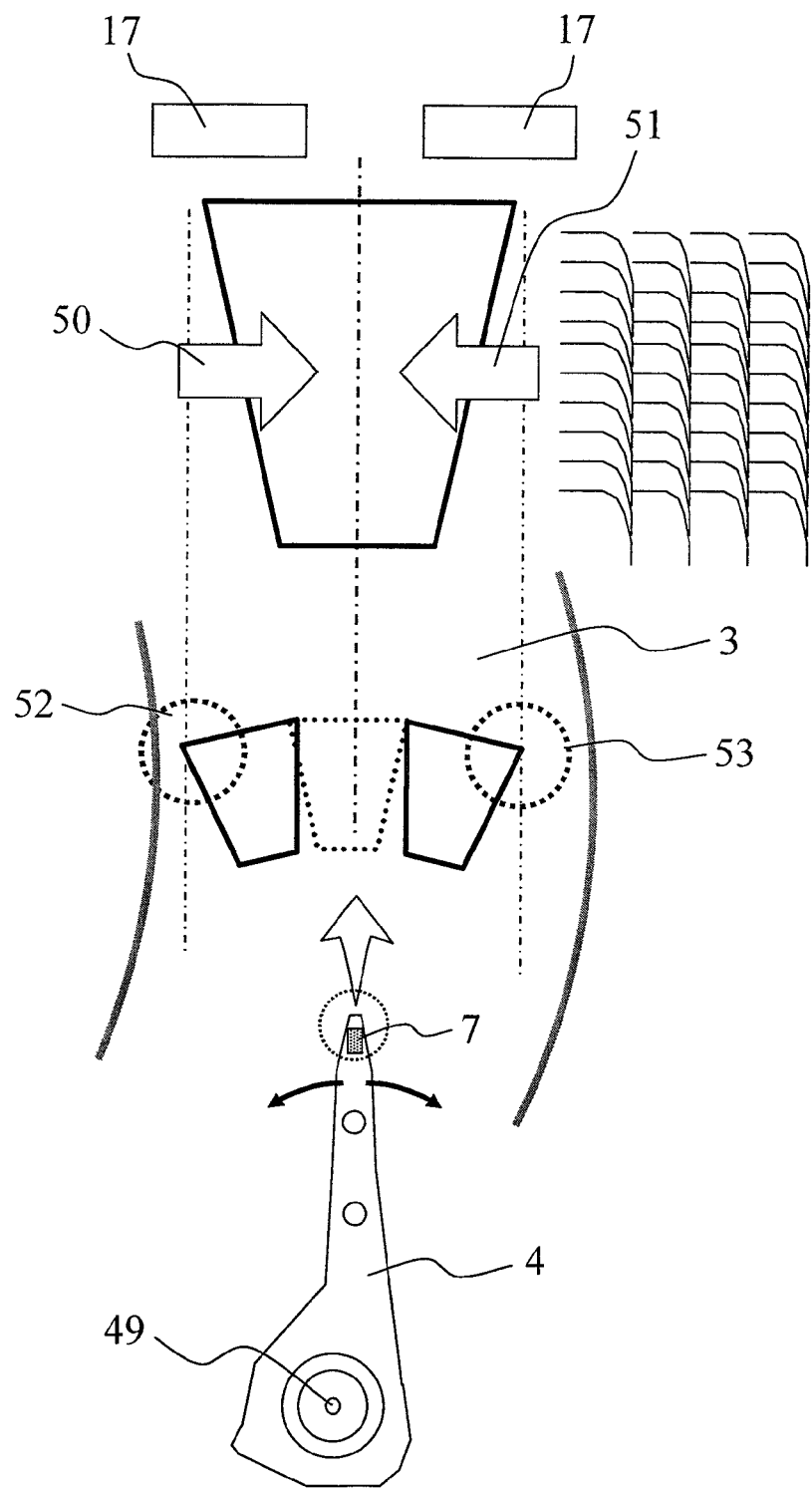
FIG. 33 is a diagram illustrating a fourth embodiment according to the present invention.

At last, as a fourth embodiment, a dual edge structure is described in which an FGL is formed on both sides of the main pole. As illustrated in FIG. 33, the HGA 4 on which the magnetic head slider 7 is installed positions the head slider 7 to the left or right around a rotating axis 49 to perform positioning of the head slider 7 to a desired track. When a track on the inner diameter or the outer diameter of the magnetic disk 3 is selected from the structure, the center axis of the magnetic head is arranged so as to be inclined by a certain angle (skew angle) for the track. In principle, in the shingled write system in which only one side of the main pole is used, a magnetic field gradient formed on the inner diameter side or outer diameter side in the main pole is relatively gentle due to the effect of the skew angle, so that the magnetization transition width is large and the track pitch cannot be reduced in one side. On the other hand, as illustrated by arrows 50 and 51 in FIG. 33, using a track on the intermediate diameter of the magnetic disk as a boundary, the track scanning directions for the shingled write are inverted on the inner diameter and the outer diameter, so that the occurrence of a side on which the track pitch becomes large among the inner diameter and the outer diameter can be prevented by newly employing a control method using sides having different main poles. For example, when recording is performed on the inner diameter in FIG. 33, the scanning direction of the magnetic head slider is set to be a direction towards the center from the inner diameter (arrow 50), and an edge 52 on the inner diameter in which the corner of the main pole is directed to the track at a deep angle is used for the recording. On the contrary, when record is performed on the track on the outer diameter from the center, the scanning direction of the magnetic head slider is set to be a direction towards the center from the outer diameter (arrow 51), an edge 53 on the outer diameter of the main pole is used for the recording. The main point is to use only the corner of a side on which the main pole magnetic field is steep in any of the inner diameter and the outer diameter. The MAMR head of the shingled write system suitable for such a recording method has a dual edge structure in which the MAMR element 17 is arranged on both sides of the main pole.

Figure 34:
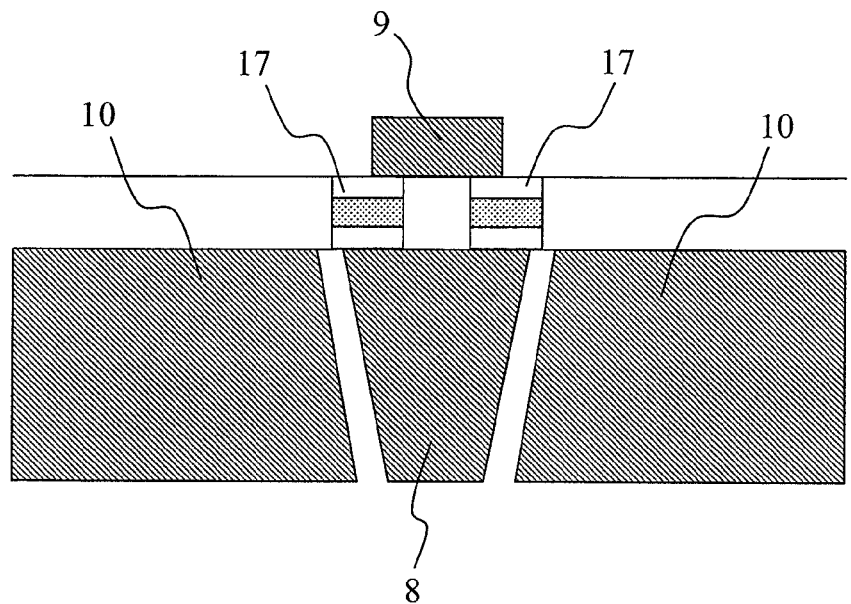
FIG. 34 is a diagram illustrating a recording head structure of the fourth embodiment
Figure 35:
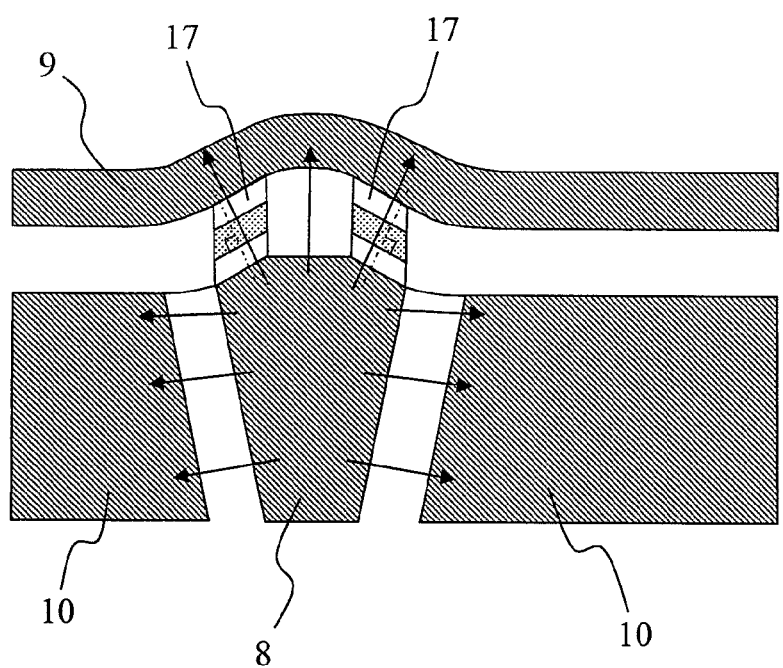
FIG. 35 is a diagram illustrating the recording head structure of the fourth embodiment according to the present invention.

For example, a structure is employed in which, as illustrated in FIG. 34, as a modification example of the first embodiment, the MAMR elements 17 are arranged on the both sides of the main pole and each of the side shields 10 and each of the trailing shields 9 are separated, or a structure is employed in which, as illustrated in FIG. 35, as the modification of the third embodiment 3, gradients are formed at the both sides of the main pole, and the MAMR element 17 is arranged on the gradient portion. As a result, even when the skew angle is taken into account, the respective sharp edges can be used for recording, so that recording with narrower track pitch and higher density can be performed. In FIG. 34, as a result, the trailing shield 9 is downsized, the steepening of the magnetic field gradient as an original function of the trailing shield is achieved with steep gradient of high-frequency magnetic field by the MAMR element 17, so that the problem of the steepening does not particularly occur.

Figure 36:
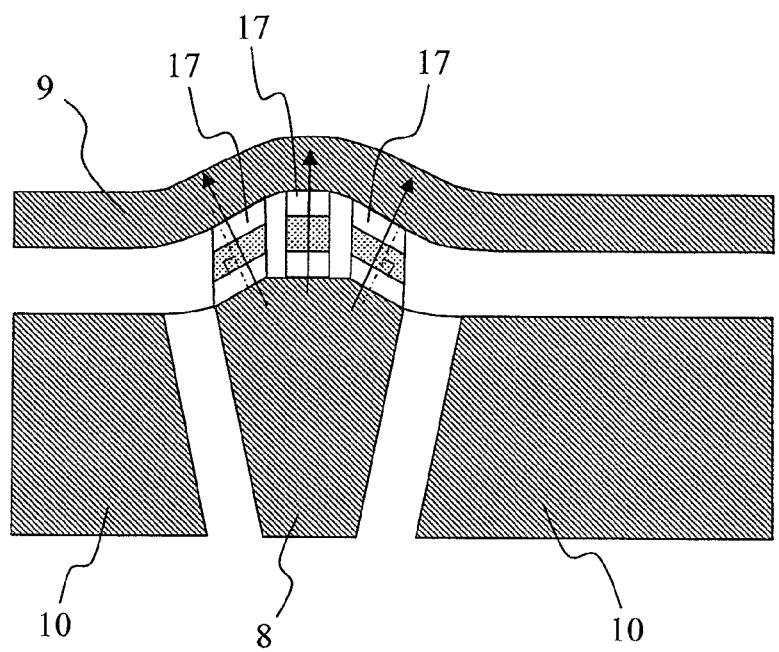
FIG. 36 is an illustrative diagram when three MAMR elements are used among the recording head structure of the fourth embodiment according to the present invention.
Figure 37:
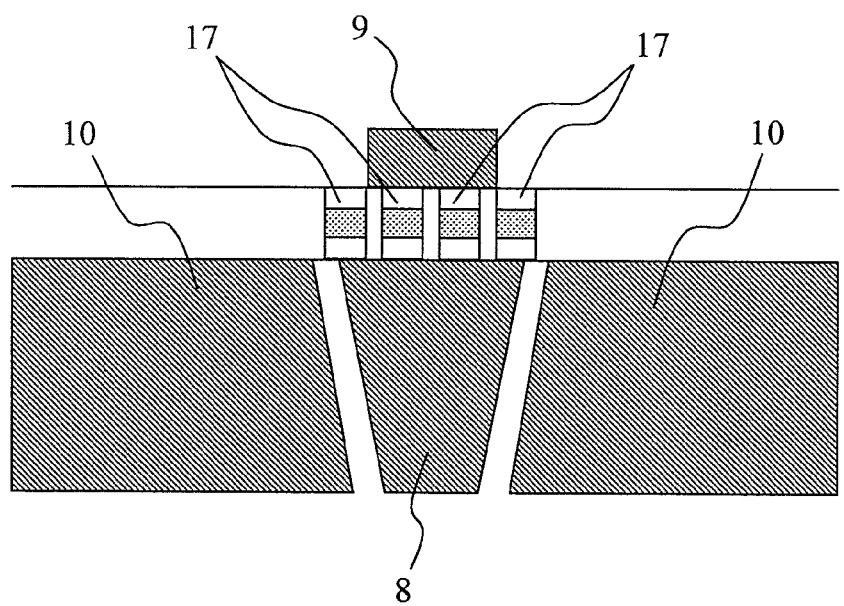
FIG. 37 is an illustrative diagram when four MAMR elements are used among the recording head structure of the fourth embodiment according to the present invention.

As a modification example, three or more of MAMR elements 17 can be configured to be arranged. The structure in the case in which the three MAMR elements 17 are used is described in FIG. 36, and the structure in the case in which the four MAMR elements 17 are used is described in FIG. 37. The MAMR element has the limited dimension for stable oscillation of an FGL that is the heart of the technology, and the value is determined so as to be set about 50 nm of the FGL width due to the limitation of the single magnetic domain. Therefore, a microwave-assisted effect in which stable oscillation is performed within a desired space can be obtained by arranging three or more of a plurality of MAMR elements as appropriate.

As described above, the best embodiments of the present invention are described, however the present invention is not limited by the embodiments, the MAMR system is applied to the shingled write system, and the present invention can be also applied to a magnetic head in which magnetic recording is performed with higher recording density.

INDUSTRIAL AVAILABILITY

The present invention can be applied to a magnetic head for hard disk drive, in particular, to a microwave-assisted magnetic recording head that employs a shingled write system.

REFERENCE SIGNS LIST 1 recording head unit
2 read head unit
3 magnetic disk
4 head gimbal assembly (HGA)
5 magneto-resistive element
6 voice coil motor
7 head slider
8 main pole
9 trailing shield
10 side shield
11 magnetic field vector from the main pole
12 track scanning direction in the recording
13 recording mark
17 MAMR element
18 auxiliary layer
19 microwave generation layer
20 spin injection layer
21 microwave generation current
22 central line of the main pole
23 end surface of the FGL
24 magnetic field profile of main pole
25 profile of FGL high-frequency magnetic field
26 underlayer
27 cap layer
28 hard bias layer
29 central line of FGL
31 end part position of main pole
32 end part position of FGL
33 insulation film
34 main pole material
35 multi-layer mask
36 shield to shield separation film
37 side shield material
38 FGL formation mask
39 separation film
40 trailing shield material
41 shield removal mask
42 insulation film
43 static magnetic field of hard bias
44 hard bias underlayer
45 hard bias material
46 cap material
47 corner part
48 gradient formation mask
49 rotating axis
50 track scanning direction (inner diameter)
51 track scanning direction (outer diameter)
60 photoresist

The invention claimed is:

1. An energy-assisted magnetic recording head comprising:
a main pole; and
a high-frequency magnetic field generating unit that is arranged adjacently to a trailing side of the main pole;
wherein a central line of the high-frequency magnetic field generating unit in a cross-track direction is separated from a central line of the main pole in the cross-track direction when viewed from an air bearing surface;
wherein a magnetic field vector from the main pole is substantially perpendicularly incident on a film surface of the high-frequency magnetic field generating unit;
wherein a width of the high-frequency magnetic field generating unit in the cross-track direction is 50 nm or less when viewed from the air bearing surface; and
wherein a width of the main pole in the cross-track direction at a side on which the main pole is adjacent to the high-frequency magnetic field generating unit is larger than the width of the high-frequency magnetic field generating unit.

2. An energy-assisted magnetic recording head comprising:
a main pole; and
a high-frequency magnetic field generating unit that is arranged adjacently to a trailing side of the main pole;
wherein a central line of the high-frequency magnetic field generating unit in a cross-track direction is separated from a central line of the main pole in the cross-track direction when viewed from an air bearing surface;
wherein the energy-assisted magnetic recording head includes a side shield arranged in a cross-track direction in the main pole and a trailing shield arranged at a trailing side of the main pole; and
wherein the high-frequency magnetic field generating unit is displaced from a center of the main pole in the cross-track direction toward a direction in which the side shield is arranged, and the trailing shield is not located on the trailing side of the side shield.

3. The energy-assisted magnetic recording head according to claim 1, wherein
the side shield is arranged only on one side of the main pole in the cross-track direction.

4. An energy-assisted magnetic recording head comprising:
a main pole; and
a high-frequency magnetic field generating unit that is arranged adjacently to a trailing side of the main pole;
wherein a central line of the high-frequency magnetic field generating unit in a cross-track direction is separated from a central line of the main pole in the cross-track direction when viewed from an air bearing surface;
wherein the energy-assisted magnetic recording head includes a hard bias layer that is adjacent to the high-frequency magnetic field generating unit in the cross-track direction and applies static magnetic field to the high-frequency magnetic field generating unit; and
wherein the direction of a static magnetic field of the hard bias layer is limited to a direction opposite to the direction in which the high-frequency magnetic field generating unit is offset with respect to the main pole.

5. An energy-assisted magnetic recording head comprising:
a main pole; and
a high-frequency magnetic field generating unit that is arranged adjacently to a trailing side of the main pole;
wherein a central line of the high-frequency magnetic field generating unit in a cross-track direction is separated from a central line of the main pole in the cross-track direction when viewed from an air bearing surface; and
wherein the high-frequency magnetic field generating unit is formed with a normal line to the film surface being oblique with respect to the central line of the main pole in the cross-track direction viewed from the air bearing surface.

6. The energy-assisted magnetic recording head according to claim 2,
wherein a magnetic field vector from the main pole is substantially perpendicularly incident on a film surface of the high-frequency magnetic field generating unit.

7. The energy-assisted magnetic recording head according to claim 4, wherein a magnetic field vector from the main pole is substantially perpendicularly incident on a film surface of the high-frequency magnetic field generating unit.

8. The energy-assisted magnetic recording head according to claim 5, wherein a magnetic field vector from the main pole is substantially perpendicularly incident on a film surface of the high-frequency magnetic field generating unit.

\* \* \* \* \*